US008270665B2

(12) United States Patent
Xuan et al.

(10) Patent No.: US 8,270,665 B2
(45) Date of Patent: Sep. 18, 2012

(54) SYSTEM AND METHOD FOR REVERSIBLE BINARY IMAGE DATA HIDING USING RUN-LENGTH HISTOGRAM MODIFICATION AND LOGICAL OPERATIONS

(75) Inventors: GuoRong Xuan, Shanghai (CN); Yun-Qing Shi, Millburn, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 903 days.

(21) Appl. No.: 12/363,344

(22) Filed: Jan. 30, 2009

(65) Prior Publication Data

US 2009/0196500 A1 Aug. 6, 2009

Related U.S. Application Data

(60) Provisional application No. 61/063,241, filed on Feb. 1, 2008.

(51) Int. Cl.
*G06K 9/00* (2006.01)

(52) U.S. Cl. ........................................ 382/100; 382/168

(58) Field of Classification Search ........................ None
See application file for complete search history.

(56) References Cited

U.S. PATENT DOCUMENTS

| | | | | |
|---|---|---|---|---|
| 7,974,477 | B2 * | 7/2011 | Shi et al. | 382/232 |
| 2003/0179900 | A1 * | 9/2003 | Tian et al. | 382/100 |
| 2004/0223627 | A1 * | 11/2004 | Shi et al. | 382/100 |
| 2005/0129271 | A1 * | 6/2005 | Shi et al. | 382/100 |
| 2005/0141747 | A1 * | 6/2005 | Shi et al. | 382/100 |
| 2005/0244032 | A1 * | 11/2005 | Shi et al. | 382/100 |
| 2006/0120558 | A1 * | 6/2006 | Shi et al. | 382/100 |
| 2006/0126890 | A1 * | 6/2006 | Shi et al. | 382/100 |
| 2008/0002851 | A1 | 1/2008 | Shi et al. | |
| 2008/0199093 | A1 | 8/2008 | Shi et al. | |

OTHER PUBLICATIONS

International Preliminary Report on Patentability for PCT/US2009/032539 issued Aug. 3, 2010.

Guorong, X., et al., "Lossless Data Hiding Using Histogram Shifting Method Based on Integer Wavelets," International Workshop on Digital Watermarking, Nov. 8-10, 2006, pp. 323-332.

Kamstra, L., et al., "Reversible Data Embedding Into Images Using Wavelet Techniques and Sorting," IEEE Transactions on Image Processing, vol. 14, No. 12, Dec. 2005, pp. 2082-2090.

Zicheng, N., et al., "Reversible Data Hiding," IEEE Transactions on Circuits and Systems for Video Technology, vol. 16, No. 3, Mar. 2006, pp. 354-362.

Pamboukian S., et al., "Reversible Data Hiding and Reversible Authentication Watermarking for Binary Images," in VI Simpósio Brasileiro em Segurança da Informação e de Sistemas Computacionais (SBSeg), Santos, SP, Brasil, 2006, 8 pages.

Pan, J., et al., "A Lossless Watermarking Scheme for Halftone Image Authentication," International Journal of Computer Science and Network Security, vol. 6, No. 2B, Feb. 2006, pp. 147-151.

Tian, J., "Reversible Data Embedding Using a Difference Expansion," IEEE Transactions on Circuits and Systems for Video Technology, Aug. 2003, pp. 890-896.

(Continued)

*Primary Examiner* — Li Liu

(57) ABSTRACT

A method of hiding data comprising creating a histogram of an attribute of a first data set. The histogram includes occurrences of the attribute. Two adjacent occurrences are selected where a count of one of the two adjacent occurrences is zero. A second data set is embedded in data of the first data set associated with the selected adjacent occurrences.

19 Claims, 21 Drawing Sheets

OTHER PUBLICATIONS

Wang, C. C., et al., "Senary Huffman Compression—A Reversible Data Hiding Scheme for Binary Images," International Workshop on Multimedia Content Analysis and Mining (MCAM'07), Wei-Hai, China, Jun. 1, 2007, pp. 351-360.

Wu, M., et al., "Data Hiding in Digital Binary Image," IEEE International Conference on Multimedia and Expo, vol. 1, Jul. 30-Aug. 2, 2000, pp. 393-396.

Xuan, G., et al., "Lossless Data Hiding Using Histogram Shifting Method Based on Integer Wavelets," International Workshop on Digital Watermarking, Nov. 8-10, 2006, pp. 323-332.

Xuan, G., et al., "Reversible Data Hiding for JPEG Images Based on Histogram Pairs," International Conference on Image Analysis and Recognition, Aug. 22-24, 2007, Montreal, Canada, 12 pages.

Xuan, G., et al., "Optimum Histogram Pair Based Image Lossless Data Embedding," International Workshop on Digital Watermarking, Dec. 2007, Guangzhou, China, 15 pages.

Zou, D., et al., "Formatted Text Document Data Hiding Robust to Printing, Copying and Scanning," IEEE International Symposium on Circuits and Systems (ISCAS05), Kobe, Japan, May 2005.

Amano T., et al., "Feature Calibration Method for Watermarking of Document Images," 5th International Conference on Document Analysis and Recognition, Sep. 20-22, 1999, pp. 91-94.

Brassil, J., et al., "Copyright Protection for the Electronic Distribution of Text Documents," Proceeding of the IEEE, vol. 87, No. 7, Jul. 1999, 22 pages.

Huang, D., et al., "Interword Distance Changes Represented by Sine Waves for Watermarking Text Images," IEEE Transactions on Circuits and Systems for Video Technology, vol. 11, No. 12, Dec. 2001, pp. 1237-1245.

Matsui, K., et al., "Video-Steganography: How to Secretly Embed a Signature in a Picture," IMA Intellectual Property Project Proceedings, vol. 1, Issue 1, Jan. 1994, pp. 187-206.

International Search Report and Written Opinion for PCT/US2009/032539 mailed Jun. 12, 2009.

Gurong Xuan et al., "Reversible binary image data hiding by run-length histogram modification," 19$^{th}$ International Conference on Pattern Recognition, pp. 1-4, 2008: ICPR 2008; Dec. 8-11, 2008; Tampa, Florida, USA.

Sandford M. T. et al., "The Data Embedding Method," Proceedings for the SPIE, SPIE, Bellingham, VA, US, vol. 2615, Jan. 1, 1996, pp. 226-259.

* cited by examiner

2005教育部备案或批准设置的高校本专科专业

计算机科学与技术专业 http://daxue.learning.sohu.com/major_detail_169.html

计算机科学与技术专业 http://daxue.learning.sohu.com/major_detail_169.html

计算机科学与技术专业 http://daxue.learning.sohu.com/major_detail_169.html

NJIT
New Jersey's Science & Technology University
THE EDGE IN KNOWLEDGE

Everything exciting happens at the edge...

125 Years at the Edge In Knowledge

A MESSAGE FROM THE PRESIDENT

This past April, we initiated a year-long plus celebration of NJIT's 125th anniversary, recognizing our institution's evolution from Newark Technical School that opened its doors in 1881 to NJIT, New Jersey's science and technology university. On the one hand, change at our university has been far-reaching, reflecting the myriad advances in scientific knowledge and technology that have taken place over the last century and a quarter.

On the other hand, and perhaps more significantly, our institution's core values have changed little over time. Since its beginnings, NJIT has been a "transformational" institution, a school of opportunity. The majority of our students, then as now, were the first in their family to attend college; many were children of immigrants who saw a technological education as the cornerstone of a successful future. In 2006, our student body is one of the most diverse in the nation, and nearly ninety percent of our students can aspire to a college degree because of the financial aid available to them.

Another constant theme throughout the university's history has been an emphasis on learning clearly connected to the real world. Cooperative education was an important part of the educational experience at NJIT from its earliest days, and advisors from industry played a role in shaping the curriculum. Today, all NJIT students participate in experiential learning, whether through co-op employment, internships, capstone projects, service learning or research assistantships. This experience is greatly valued by employers and helps our graduates succeed in the marketplace.

The university has also had an enduring tradition of close ties to the city of Newark. The city's businesses were instrumental in establishing Newark Technical School, with many local companies pledging funds so that the new institution could welcome its first students. Charles A. Colton, the first director, described "a school that would be of service to the industries of a manufacturing city by educating those who were directly employed by those industries." Today, NJIT's incubator facilities and University Heights Science Park work to bring high-tech industries back to Newark. We also partner with the city in its redevelopment, through the Newark Downtown Core Redevelopment Corporation and neighborhood redevelopment projects.

Cutting-edge research has always been part of NJIT as well, although most technological breakthroughs initially came from industry giants like Weston and Edison. At first, Newark Technical School and later Newark College of Engineering worked to keep the curriculum current so that our graduates could build successful careers in the new enterprises created by industrial laboratories. Innovations in science and technology now flow from university research facilities, including our own. At NJIT, faculty, staff and students are helping to create and shape new technologies in such fields as nanotechnology, neural engineering, engineered particulates, and wireless telecommunications.

Even the new NJIT tagline, "The Edge in Knowledge," echoes a sentiment long prevalent at our university. President Allan R. Cullimore touched upon the same idea in 1924 when he addressed the second class to earn engineering degrees and said, "A training such as you have had will prove valuable to you as individuals but in a very much broader sense it will only be worthwhile if it is reflected directly in the progress of mankind."

In this current report, we have tried to convey the great energy and excitement that can be seen in every endeavor at NJIT. I hope you will find this year's report one of progress.

Robert A. Altenkirch
President of NJIT

FIG. 14(a)

125 Years at the Edge In Knowledge

A MESSAGE FROM THE PRESIDENT

This past April, we launched a year-long celebration of NJIT's 125th anniversary, recognizing our institution's evolution from Newark Technical School that opened its doors in 1881 to NJIT, New Jersey's science and technology university. On the one hand, change at our university has been far-reaching, reflecting the myriad advances in scientific knowledge and technology that have taken place over the last century and a quarter.

On the other hand, and perhaps more significant, our institution's core values have changed little over time. Since its beginnings, NJIT has been a "transformational" institution, a school of opportunity. The majority of our students, then as now, were the first in their family to attend college; many were children of immigrants who saw a technological education as the cornerstone of a successful future. In 2006, our student body is one of the most diverse in the nation, and nearly ninety percent of our students can aspire to a college degree because of the financial aid available to them.

Another constant theme throughout the university's history has been an emphasis on learning clearly connected to the real world. Cooperative education was an important part of the academic experience at NJIT from its earliest days, and advisors from industry played a role in shaping the curriculum. Today, all NJIT students participate in experiential learning, whether through co-op employment, internships, capstone projects, service learning or research assistantships. This experience is greatly valued by employers and helps our graduates succeed in the marketplace.

The university has also had an enduring tradition of close ties to the city of Newark. The city's businesses were instrumental in establishing Newark Technical School, with many local companies pledging funds so that the new institution could welcome its first students. Charles A. Colton, the first director, described "a school that would be of service to the industries of a manufacturing city by educating those who were directly employed by these industries." Today, NJIT's incubator facilities and University Heights Science Park work to bring high-tech industries back to Newark. We also partner with the city in its redevelopment, through the Newark Downtown Core Redevelopment Corporation and neighborhood redevelopment projects.

Cutting-edge research has always been part of NJIT as well, although most technological breakthroughs initially came from industry giants like Weston and Edison. At first, Newark Technical School and later Newark College of Engineering worked to keep the curriculum current so that our graduates could build successful careers in the new enterprises created by industrial laboratories. Innovations in science and technology now flow from university research facilities, including our own. At NJIT, faculty, staff and students are helping to create and shape new technologies in such fields as nanotechnology, neural engineering, engineered particulates, and wireless telecommunications.

Even the new NJIT tagline, "The Edge in Knowledge," echoes a sentiment long prevalent at our university. President Allan R. Cullimore touched upon the same idea in 1934 when he addressed the second class to earn engineering degrees and said, "A training such as you have had will prove valuable to you as individuals but in a very much broader sense it will only be worthwhile if it is reflected directly in the progress of mankind."

In this annual report, we have tried to convey the great energy and excitement that can be seen in every endeavor at NJIT. I hope you will find this year's report one of progress.

Robert A. Altenkirch

Robert A. Altenkirch
President of NJIT

FIG. 14(b)

125 Years at the Edge in Knowledge

A MESSAGE FROM THE PRESIDENT

NJIT CAMPUS MAP

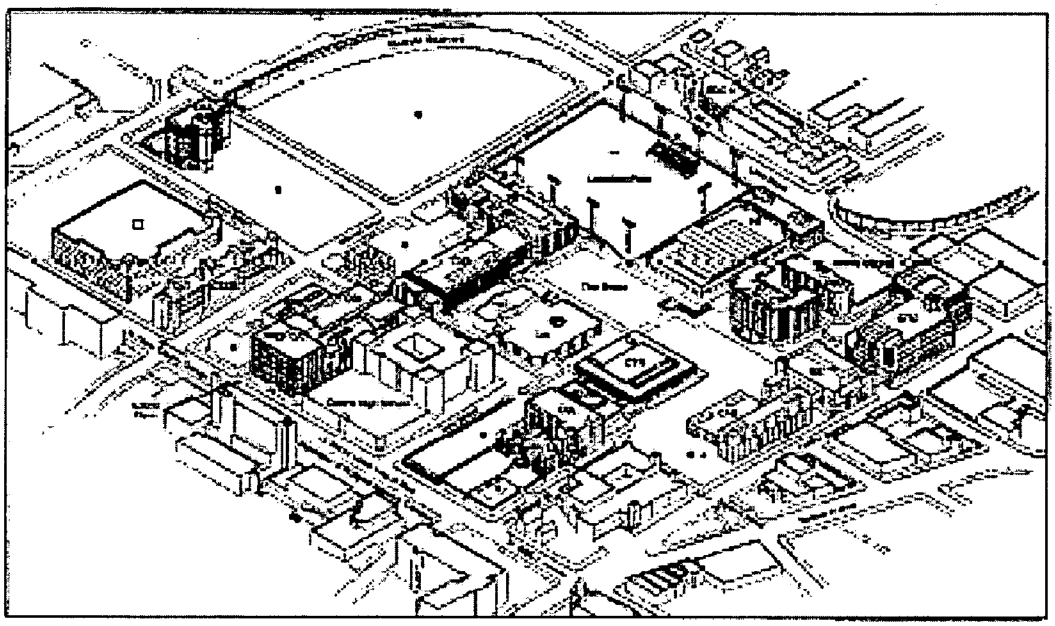

KEY TO MAP

Central Avenue Building (Library) ........ CAB
Campbell Hall ........ CAM
Geo. H. York Center for
Environmental Engineering & Science ........ CEES
Colton Hall ........ COL
Hazell Center ........ CTR
Cullimore Hall ........ CUL
Cypress Hall ........ CYP
Eberhardt Hall ........ EB
Electrical and Computer
Engineering Center ........ ECE
Enterprise Development Center I ........ EDC I
Enterprise Development Center II ........ EDC II
Faculty Memorial Hall ........ FAC
Wilbur S. Guttenberg
Information Technologies Center ........ GITC
Mechanical Engineering Center ........ ME
Microelectronics Center ........ MIC
Oak Hall ........ OAK
Physical Education Building ........ PE
Redwood Hall ........ RED
Sports Building ........ SPAC
Tiernan Hall ........ TIE
Theatre ........ TH
University Hall ........ UH
Weston Hall ........ WES
Wilson Alumni Center ........ ALUM
Parking ........ ■
Parking Deck ........ ☐
Guest Parking ........ ▲
Newark Subway (Warren St. Station) ........ ●

MAIN OFFICES

Admissions: Undergraduate and Graduate ........ CAB
Alumni Affairs ........ ALUM
Bursar ........ CUL
Campus Center ........ CTR
Career Services Division ........ WES
Center for Manufacturing Systems (CAMS) ........ GITC
College of Science & Liberal Arts, Dean ........ CUL
Continuing Professional Education ........ WES
Cooperative Education & Internships ........ WES
Economic Development ........ EB
Educational Opportunity Program ........ CUL
Financial Aid ........ CUL
Freshman Studies, Dean ........ EB
Graduate Studies ........ FB
Hazardous Substance Management
Research Center (HSMRC) ........ CEES
Honors Program ........ CUL
Human Resources ........ CUL
International Students & Faculty ........ EH
Newark College of Engineering, Dean ........ GITC
Physical Education & Athletics ........ PE
Public Safety ........ ☐
Registrar ........ CTR
Research ........ CUL
Residence Life ........ CYP
School of Architecture, Dean ........ WES
School of Industrial Management, Dean ........ CAB
Sponsored Programs ........ EB
Student Employment ........ WES
Student Services, Dean ........ EB
University Administration ........ EB
University Advancement ........ EB
Van Houten Library ........ CAB New Jersey Institute of Technology • University Heights • Newark • New Jersey • 07102-1982 • 201. 596. 3000

FIG. 15(a)

SYSTEM AND METHOD FOR REVERSIBLE BINARY IMAGE DATA HIDING USING RUN-LENGTH HISTOGRAM MODIFICATION AND LOGICAL OPERATIONS

CROSS REFERENCE TO RELATED APPLICATIONS

The present application claims priority to U.S. Provisional Application No. 61/063,241 filed on Feb. 1, 2008, and entitled REVERSIBLE BINARY IMAGE DATA HIDING USING RUN-LENGTH HISTOGRAM AND LOGICAL OPERATION.

FIELD

The subject of the disclosure relates generally to data embedding and data extraction from a digital format image. More specifically, the disclosure relates to reversible binary image data hiding using run-length histogram modification and logical operations.

SUMMARY

A representative embodiment relates to a reversible binary image data hiding technology that can be applied to any type of binary images (either text, or graph, or mixture of text and graph) as well as halftone images. Reversible image data hiding technology refers to imperceptibly hiding data in digital images and reconstructing the original image without any distortion after the hidden data has been extracted out.

According to at least one representative embodiment, a run-length histogram modification is utilized for reversible binary image data hiding. More specifically, the run-lengths of binary images are generated and their histograms are modified to embed data reversibly. The histogram modification and shifting can achieve lossless data hiding.

According to at least one representative embodiment, black and white run-lengths manipulation is combined with a histogram-pair operation used for reversible data hiding. Both black and white run-lengths are manipulated in order to resolve an issue of isolated white pixels in the cover binary image that may damage reversibility. In order to increase the data embedding capability and enhance the visual quality of the marked binary image (the binary image with data hidden inside), a transformation is applied which involves a logic operation to a cover binary image prior to applying the run-length histogram modification based reversible data hiding. The corresponding inverse transformation is applied to what is left after data extraction using the run-length histogram modification based data extraction technology. Representative transformations presented herein include using an AND operation and using an XOR operation.

The representative embodiments can be applied to both non-halftone binary images and halftone binary images. They can be used for text, graph, and a mixture of text and graph binary images. These binary images can be generated by camera, or scanner, or word processor, or computer graphic software. Data can be embedded into a binary image directly without involving word processing software. For lossless data hiding into binary text image, there is no need to perform “row-division” or “word-division.” In extracting hidden data with the representative embodiments, the original binary image is not needed. The binary image with hidden data is not noticeable by a human visual system. The higher the resolution of the host binary image is, the larger amount of data can be embedded, and the better performance can be achieved.

Representative embodiments can be applied to a variety of areas using binary image, including image authentication, annotation, and cover communication (often referred to as steganography).

Representative embodiments described herein provide reversible binary image data hiding which applies histogram-pair based reversible data hiding to histogram of black run-lengths of binary images. By manipulating white and black run-lengths properly, isolated white points can be successfully eliminated. Logical operations such as AND and XOR operations can also be used to enhance embedding capability substantially.

Compared with current existing reversible binary image data hiding schemes, the representative embodiments described herein can embed more data at the same number of changed pixels (hence the visual quality of marked images evaluated by the same peak signal noise ratio (PSNR)) resulting in fewer changes in a marked image versus an original. Embedding the same amount of data into binary images can be applied to both binary non-halftone images and halftone images. According to at least one representative embodiment, it appears that transformation with an AND operation is suitable for non-halftone binary image while transformation with an XOR operation is more suitable for halftone binary images.

Other principal features and advantages will become apparent to those skilled in the art upon review of the following drawings, the detailed description, and the appended claims.

BRIEF DESCRIPTION OF THE DRAWINGS

Representative embodiments are hereafter described with reference to the accompanying drawings.

FIG. 1(*b*) is a histogram diagram of the image from the histogram diagram of FIG. 1(*a*) shifted with one histogram-pair created.

FIG. 1(*c*) is a histogram diagram of the image from the histogram diagram of FIG. 1(*b*) after bits 1,0 are embedded.

FIG. 7(*b*) is the image of FIG. 7(*a*) marked with 128 bits.

FIG. 7(*c*) is the image of FIG. 7(*a*) with 137 pixels changed.

FIG. 8(*b*) is a histogram of the image of FIG. 7(*a*) after an AND operation.

FIG. 9(*b*) is the image of FIG. 9(*a*) marked with 1063 bits using an AND operation.

FIG. 9(*c*) is the image of FIG. 9(*a*) with 1644 pixels changed.

FIG. 10(*b*) is the image of FIG. 10(*a*) marked with 7699 bits embedded.

FIG. 10(*c*) is the image of FIG. 10(*a*) with 6787 bits changed.

FIG. 11(*b*) is a run-length histogram after transformation with an XOR operation.

FIG. 12(*a*) is an original image of a Chinese document.

FIG. 12(*b*) is the image of FIG. 12(*a*) marked with 18,037 bits embedded.

FIG. 12(*c*) is the image of FIG. 12(*a*) with 9106 pixels changed.

FIG. 13(*b*) is the image of FIG. 13(*a*) marked with bits embedded.

FIG. 13(*c*) is the image of FIG. 13(*a*) with pixels changed.

FIG. 14(*b*) is the image of FIG. 14(*a*) marked with bits embedded.

FIG. 14(*c*) is the image of FIG. 14(*a*) with pixels changed.

FIG. 15(*b*) is the image of FIG. 15(*a*) marked with 18,037 bits embedded.

FIG. 15(*c*) is the image of FIG. 15(*a*) with 9,159 pixels changed.

DETAILED DESCRIPTION

Figure 1A:
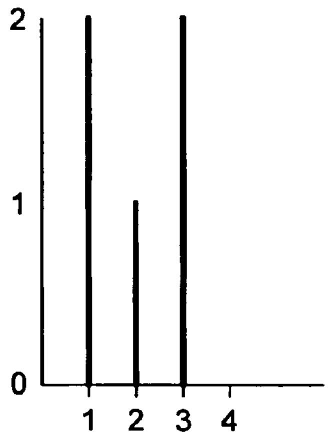
FIG. 1(*a*) is a histogram diagram of an original image.
Figure 1B:
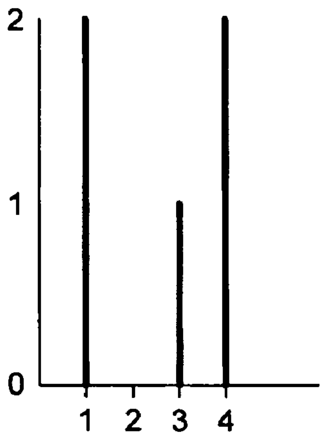
Figure 1C:
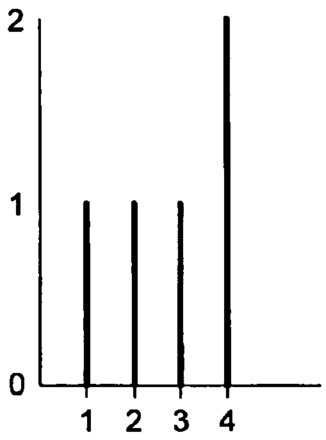

FIG. 1(*a*) illustrates a histogram corresponding to a one-dimensional (1-D) sequence, [3,3,1,2,1], which is a portion of a row in a grayscale image, used for reversible data hiding and consisting of five pixels: 3,3,1,2,1. The histogram of FIG. 1(*a*) includes three vertical bars. The three vertical bars can be represented by h(1)=2, h(2)=1, and h(3)=2. Here, h(1)=2 denotes that in this image there are two pixels assuming grayscale value 1.

FIG. 1(*b*) illustrates the embedding of data using a histogram pair. An example histogram-pair based lossless data hiding method and apparatus is described in U.S. patent application Ser. No. 11/676,399, filed Feb. 19, 2007, entitled "Apparatus and Method for Reversible Data Hiding for JPEG Images," and incorporated herein by reference in its entirety. By way of example, data is embedded at pixels having a grayscale equal to 1 and/or 2 in order to create a zero point in the histogram at grayscale value 2. Therefore, as shown in FIG. 1(*b*), change h(1)=2 is not changed. However, h(2)=1 is shifted to h(3)=1, leaving h(2)=0, thus creating one histogram-pair, i.e., [h(1)=2, h(2)=0]. Further, h(3)=2 is shifted to h(4)=2, meaning that both h(2) and h(3) are shifted towards the right-hand size by one unit. As such, data can now be embedded into the created histogram-pair [h(1)=2, h(2)=0].

Two bits—1, 0—are embedded into the created histogram-pair. The pixel sequence is scanned from left to right. When the first pixel having grayscale 1 is found (the third pixel among the five pixels), the first bit to be embedded is determined to be 1 and the grayscale value is changed at the third pixel from 1 to 2. The pixel sequence is continued to be scanned. When the second pixel having grayscale 1 is found (the fifth pixel among the five pixels), the second bit to be embedded is determined to be 0 and the grayscale value is not changed. Since all pixels have been scanned, the embedding is complete. Two pixels having a grayscale value equal to 2 have been used for the data embedding. The resulting histogram of the marked image (image with data hidden inside) is shown in FIG. 1(*c*). The pixel grayscale value sequence becomes [4,4,2,3,1].

During data extraction, the marked image is scanned one pixel by one pixel in the same order as followed in the data embedding. When a pixel is found having grayscale value equal to 2 (the third pixel among the five), bit 1 is extracted. When a pixel having its grayscale value equal to 1 (the last pixel among the five) is encountered, bit 0 is extracted. After bit sequence 1,0, is extracted, all grayscale values equal to or larger than 2 are reduced by 1. In this way, the pixel grayscale value sequence is converted from [4,4,2,3,1] back to [3,3,1,2,1]. As such, the histogram-based data hiding scheme is reversible. That is, the embedded data can be extracted without error and the original cover image can be recovered losslessly.

The following are additional examples that illustrate how a histogram-pair based lossless data hiding process can be applied to the histogram of a run-length (RL) of a binary image.

In a first example, it is shown how to embed data into a binary image by manipulating a RL histogram. It can be noted that there is no pre-transformation operation involved. A simple binary image consisting of only two lines and 15 columns is shown in Table 1 for illustration purpose, where 0 and 1 are used to denote white pixel and black pixel, respectively.

TABLE 1

| Number of Column | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Odd line x1 | 1 | 0 | 0 | 0 | 0 | 0 | 0 | 0 | 0 | 0 | 0 | 0 | 1 | 1 | 1 |
| Even line x2 | 0 | 0 | 1 | 0 | 0 | 1 | 0 | 0 | 1 | 0 | 0 | 1 | 0 | 0 | 1 |

The RL and the histogram of RL of the binary image are shown in Table 2. In forming the black and white runs and then counting the corresponding RL's, the scanning is conducted from left to right, from the top line to the bottom line. That is, line x1's end is linked with the head of line x2, forming a one-dimensional (1-D) sequence. The black and white run length is then determined. Other way to scan the whole binary image to form a 1-D sequence is feasible. Furthermore, along the scan sequencing, black RL and its immediately next white RL are combined to form a couple, called a couple of black RL and white RL, or simply a RL couple. It is noted that both black RL and white RL are considered.

TABLE 2

| | | | |
|---|---|---|---|
| Black RL sequence: <1, 3, 1, 1, 1, 1><br>White RL sequence: <11, 2, 2, 2, 2, 2><br>Sequence of all of RL couples:<br><1, 11>, <3, 2>, <1, 2>, <1, 2>, <1, 2>, <1, 2>. | | | |
| Black RL | 1 | 2 | 3 |
| Histogram of black RL (occurrence) | 5 | 0 | 1 |
| White RL | 1 | 2 | 11 |
| Histogram of white RL (occurrence) | 0 | 5 | 1 |

According to a representative embodiment, a histogram-pair based lossless data hiding method can embed data into a binary image. In line x1, for the first 1 (line x1, column 1), the first to be embedded bit, which is 1, is examined. The pixel is changed at line x1 and column 2 from 0 to 1 in order to change the black RL from 1 to 2. Consequently, the corresponding white RL is reduced by 1. The next single black point (line x2 and column 3) is examined, since bit 1 is to be embedded, and the white pixel (line x2, column 4) is changed to black. For the single black point at line x2 and column 6, since bit 0 is to be embedded, nothing is done. For the next single black point at line 2 and column 9, since bit 1 is to be embedded, the next white pixel (line x2, column 10) is changed to 1. For the last single black pixel at line x2 and column 12, since bit 0 is to be embedded, nothing is done. The resultant binary image after data embedding is shown in Table 3, and its RL and RL are shown in Table 4. In Table 4, two parameters T and T1 are listed. T is a parameter used in histogram-pair based lossless data hiding for grayscale images and it indicates the embedding starting position. Here, for a binary image, T indicates the value of black RL, on which data is losslessly embedded. In this example, T=1. T1 is another threshold parameter, defined being equal to the sum of a black RL and the RL of a white run immediately follow the black run, below which the RL couple will not be used for data embedding. In this example, T1=3 which means that data embedding is not applied to any black RL if the sum of the black RL and its immediately next white RL is less than 3.

An example procedure to extract hidden data is now described. At this stage, the marked image, i.e., the image with hidden data, is given. In this example, the marked image data is shown in Table 3. Based on the marked image of Table 3, it is possible to come up with the RL and histogram of RL associated with the marked image, as shown in Table 4. Now, all of the black runs are examined one by one in the same order as in data embedding, i.e., from left to right, from top to bottom. Whenever a black RL 1 is encountered, a bit 0 is extracted. Whenever a black RL 2 is encountered, a bit 1 is extracted. In this way, a bit sequence of "1,1,0,1,0" is extracted. Furthermore, whenever a bit 1 is extracted, the corresponding black RL 2 is reduced to 1. In this way, the original image can be recovered after all of the hidden data has been extracted out.

TABLE 3

| Number of Column | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Odd Line x1 | 1 | 1* | 0 | 0 | 0 | 0 | 0 | 0 | 0 | 0 | 0 | 0 | 1 | 1 | 1 |
| Even Line x2 | 0 | 0 | 1 | 1* | 0 | 1 | 0 | 0 | 1 | 1* | 0 | 1 | 0 | 0 | 1 |

TABLE 4

| | | | |
|---|---|---|---|
| Black RL: <2, 3, 2, 1, 2, 1><br>White RL: <10, 2, 1, 2, 1, 2><br>RL couples: <2, 11>, <3, 2>, <2, 1>, <1, 2>, <2, 1>, <1, 2>. | | | |
| Black Run Length | 1 | 2 | 3 |
| Histogram of Black Run Length (occurrence) | 2 | 3 | 1 |
| White Run Length | 1 | 2 | 10 |
| Histogram of Black Run Length (occurrence) | 2 | 3 | 1 |

According to another representative embodiment, a RL histogram pair reversible binary image data hiding process with transformation involves an AND operation. In this type of transformation, the cover image is first split into two parts: an even part and an odd part. The even part refers to the collection of all of the even rows, and the odd part refers to the collection of all of the odd rows. Alternative partitions of the cover image, e.g., the collection of even columns and the collection of odd columns, are possible. Even rows and odd rows are used in this description as the two parts of the cover image.

Figure 2:
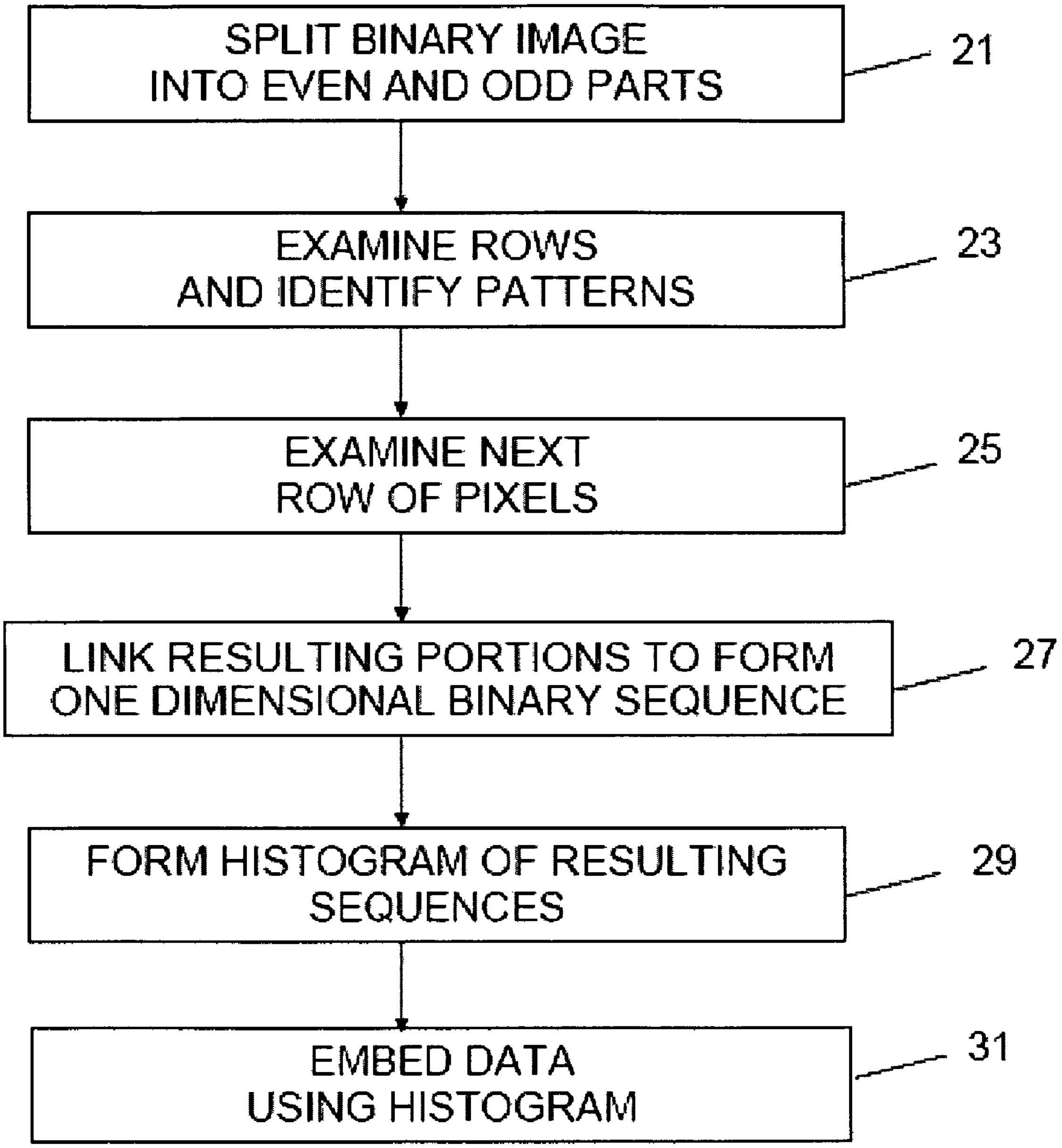
FIG. 2 is a flow diagram of a data hiding process including an AND operation in accordance with a representative embodiment.

FIG. 2 illustrates a flow diagram of operations performed in a representative RL histogram pair reversible binary image data hiding process with a transformation including an AND operation. Additional, fewer, or different operations may be performed depending on the particular embodiment. In an operation 21, a cover binary image is split into even and odd parts denoted by X1 and X2, respectively. In an operation 23, each row in X1 is examined and patterns are identified, each starting with one black pixel and followed by a series of continuous white pixels.

In an operation 25, for each pattern identified in operation 23, the corresponding portion of pixels in the immediately next row is examined. The beginning consecutive white pixels and the ending consecutive black pixels are discarded. In an operation 27, the resultant portions are linked sequentially. An example sequencing is done from left to right and from top to bottom, forming a one-dimensional (1-D) binary sequence. In an operation 29, a run-length technique is applied to this binary 1-D sequence to form a histogram of all of resultant run-lengths. The histogram is generally multi-valued. In an operation 31, a histogram-pair based lossless data hiding algorithm is applied to embed data using the generated RL histogram.

A two-row binary image example illustrates pre-transformation with an AND operation. As discussed above, black and white pixels (also referred to as black and white points) are represented by 1 and 0, respectively.

TABLE 5

| Number of Column | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Even line x2 | 0 | 0 | 1 | 0 | 0 | 1 | 0 | 0 | 1 | 0 | 0 | 1 | 0 | 1 | 1 |
| Odd line x1 | 1 | 0 | 0 | 0 | 0 | 0 | 0 | 0 | 0 | 0 | 0 | 0 | 1 | 1 | 1 |
| Window: W1 Covering the pattern in x1 with "1 black pixel followed by consecutive white pixels" | 1 | 1 | 1 | 1 | 1 | 1 | 1 | 1 | 1 | 1 | 1 | 1 | | | |
| L1 = x1 ∩ W1 | 1 | 0 | 0 | 0 | 0 | 0 | 0 | 0 | 0 | 0 | 0 | 0 | | | |
| L2 = x2 ∩ W1 | 0 | 0 | 1 | 0 | 0 | 1 | 0 | 0 | 1 | 0 | 0 | 1 | | | |
| Window: W2 Eliminating consecutive white pixels proceeding 1st black pixel and consecutive black pixels at the end | | | 1 | 1 | 1 | 1 | 1 | 1 | 1 | 1 | 1 | | | | |
| L3 = L2 ∩ W2 | | | 1 | 0 | 0 | 1 | 0 | 0 | 1 | 0 | 0 | | | | |

The last row (L3) in Table 5 is a binary sequence derived from the above-described AND operation. This resultant binary sequence can be used for RL histogram pair to embed data into the binary image losslessly as described above.

In Table 6, another binary image with four rows and 15 columns is considered. By applying the procedures described above, it is possible to identify three sequences of points in the image, which are shown in Table 7. These three sequences shown in Table 7 are a portion of the image after an AND operation. The RL and its histogram are shown in Table 8. It is observed that there is a histogram pair in the black RL histogram, which can be used for data embedding. The portion of image, after binary bits "1,1,0,1" have been embedded, is shown in Table 9. The RL and histogram of RL of the portion of the image after embedding "1,1,0,1" are shown in Table 10. At this point, the portion of the image after data embedding is put back to form the even part of the image. Combining this changed even part with the unchanged odd part, a marked image is produced, which is shown in Table 11.

TABLE 6

| No. of column | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Odd row x1 | 1 | 0 | 0 | 0 | 0 | 0 | 0 | 0 | 0 | 0 | 0 | 0 | 1 | 1 | 1 |
| Even row x2 | 0 | 0 | **1** | **0** | **0** | **1** | **0** | **0** | **1** | **0** | **0** | 1 | 0 | 1 | 1 |
| Odd row x3 | 0 | 1 | 0 | 0 | 0 | 0 | 0 | 0 | 1 | 1 | 1 | 0 | 0 | 0 | 1 |
| Even row x4 | 0 | 0 | **1** | **1** | **1** | **0** | **0** | 1 | 1 | 0 | 0 | **1** | **0** | **0** | 1 |

TABLE 7

| | | | | | | | | | | | | | | | | |
|---|---|---|---|---|---|---|---|---|---|---|---|---|---|---|---|---|
| Portion of image | Portion of x2 | 0 | 0 | **1** | **0** | **0** | **1** | **0** | **0** | **1** | **0** | **0** | 1 | 0 | 1 | 1 |
| | Portion of x4 | 0 | 0 | **1** | **1** | **1** | **0** | **0** | 1 | 1 | 0 | 0 | **1** | **0** | **0** | **0** |

TABLE 8

Black RL<1, 1, 1, 3, 1>
White RL<2, 2, 2, 2, 2>
RL couples: <1, 2>, <1, 2>, <1, 2>, <3, 2>, <1, 2>.

| Black RL | 1 | 2 | 3 |
|---|---|---|---|
| Histogram of black RL (occurrence) | 4 | 0 | 1 |

Comment: RL histogram pair [4, 0] can be used for data embedding using histogram pair method.

TABLE 9

| | | | | | | | | | | | | | | | | |
|---|---|---|---|---|---|---|---|---|---|---|---|---|---|---|---|---|
| Portion of Image | Portion of x2 | 0 | 0 | **1** | 1* | **0** | **1** | 1* | **0** | **1** | **0** | **0** | 1 | 0 | 1 | 1 |
| | Potion of x4 | 0 | 0 | **1** | **1** | **1** | **0** | **0** | 1 | 1 | 0 | 0 | **1** | 1* | **0** | 1 |

TABLE 10

| | | | |
|---|---|---|---|
| RLC of Region of Interest in Even Lines before Embedded Black RLC<2, 2, 1, 3, 2> White RLC<1, 1, 2, 2, 1> which from black and white couples of run length <2, 1>, <2, 1>, <1, 2>, <3, 2>, <2, 1>. | | | |
| Black Run Length | 1 | 2 | 3 |
| Histogram of Black Run Length (occurrence) | 1 | 3 | 1 |

TABLE 11

| No. of column | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Odd line x1 | 1 | 0 | 0 | 0 | 0 | 0 | 0 | 0 | 0 | 0 | 0 | 0 | 1 | 1 | 1 |
| Even line x2 | 0 | 0 | 1 | 1* | 0 | 1 | 1* | 0 | 1 | 0 | 0 | 1 | 0 | 1 | 1 |
| Odd line x3 | 0 | 1 | 0 | 0 | 0 | 0 | 0 | 0 | 1 | 1 | 1 | 0 | 0 | 0 | 1 |
| Even line x4 | 0 | 0 | 1 | 1 | 1 | 0 | 0 | 1 | 1 | 0 | 0 | 1 | 1* | 0 | 1 |

According to a representative embodiment, data extraction starts from the marked binary, which is given in Table 11. It is possible to split the marked binary into an odd part X1 and an even part X2. Because the odd part X1 remains unchanged during the data embedding, it helps in data extraction. This can be seen as follows. After the even part is extracted, using the unchanged odd part, specifically x1 and x3 in this example, the portion of the marked image is identified by: 1) examining all of the patterns "1 followed by consecutive 0" in the x1 and x3; 2) take the point sequences of x2 and x4 exactly below lines x1 and x3, respectively; 3) then the beginning consecutive white pixels and the ending consecutive black pixels are discarded. As a result, the portion of the marked image shown in Table 12 is obtained. The RL and RL histogram of the portion of the marked image are shown in Table 13. For the portion of the histogram, [h(1)=1,h(2)=3], shown in Table 13, a data extraction procedure is applied to obtain the bits "1,1,0,1", leaving the portion of the marked image changed and shown in Table 14. The RL and RL histogram of the portion of the marked image after data extraction are shown in Table 15. The portion of the marked image after data extraction (Table 14) is then put back to recover the even part. Combining the odd part and the even part, the original four-row binary image is recovered, as shown in Table 16.

TABLE 12

| | | | | | | | | | | | | | | | | |
|---|---|---|---|---|---|---|---|---|---|---|---|---|---|---|---|---|
| RLC of Region of Interest in Even Line | In x2 | 0 | 0 | 1 | 1* | 0 | 1 | 1* | 0 | 1 | 0 | 0 | 1 | 0 | 1 | 1 |
| | In x4 | 0 | 0 | 1 | 1 | 1 | 0 | 0 | 1 | 1 | 0 | 0 | 1 | 1* | 0 | 1 |

TABLE 13

| | | | |
|---|---|---|---|
| Black RL: <2, 2, 1, 3, 2> White RL: <1, 1, 2, 2, 1> PL Couple: <2, 1>, <2, 1>, <1, 2>, <3, 2>, <2, 1> | | | |
| Black RL | 1 | 2 | 3 |
| Histogram of black RL (occurrence) | 1 | 3 | 1 |

Comment: RL histogram portion [1, 3] is to be used for data extraction

TABLE 14

| | | | | | | | | | | | | | | | | |
|---|---|---|---|---|---|---|---|---|---|---|---|---|---|---|---|---|
| RLC of Region of Interest in Even Line | In x2 | 0 | 0 | 1 | 0 | 0 | 1 | 0 | 0 | 1 | 0 | 0 | 1 | 0 | 1 | 1 |
| | In x4 | 0 | 0 | 1 | 1 | 1 | 0 | 0 | 1 | 1 | 0 | 0 | 1 | 0 | 0 | 0 |

TABLE 15

| | | | |
|---|---|---|---|
| Black RL: <1, 1, 1, 3, 1> White RL: <2, 2, 2, 2, 2> RL Couples: <1, 2>, <1, 2>, <1, 2>, <3, 2>, <1, 2>. | | | |
| Black RL | 1 | 2 | 3 |
| Histogram of Black RL (occurrence) | 4 | 0 | 1 |

Comment: RL histogram [1, 3] changed to histogram pair [3, 0] after data extracted.

TABLE 16

| Number of Column | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Odd Line x1 | 1 | 0 | 0 | 0 | 0 | 0 | 0 | 0 | 0 | 0 | 0 | 0 | 1 | 1 | 1 |
| Even Line x2 | 0 | 0 | **1** | **0** | **0** | **1** | **0** | **0** | **1** | **0** | **0** | 1 | 0 | 1 | 1 |
| Odd Line x3 | 0 | 1 | 0 | 0 | 0 | 0 | 0 | 0 | 1 | 1 | 1 | 0 | 0 | 0 | 1 |
| Even Line x4 | 0 | 0 | **1** | **1** | **1** | **0** | **0** | 1 | 1 | 0 | 0 | **1** | **0** | **0** | **1** |

Figure 3:
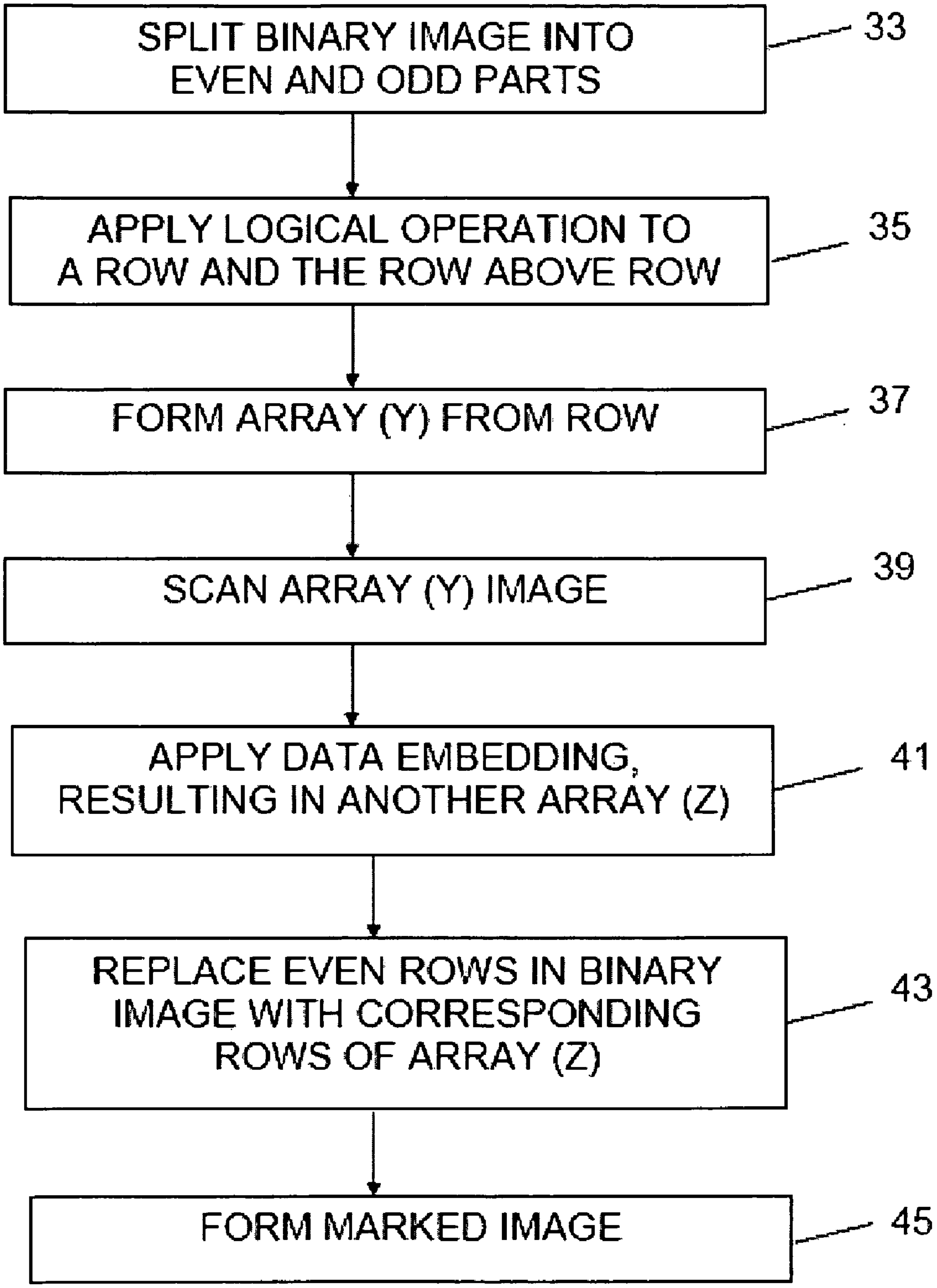
FIG. 3 is a flow diagram of a data hiding process including an XOR operation in accordance with a representative embodiment.

FIG. 3 illustrates a flow diagram of operations performed in the RL histogram pair reversible binary image data hiding process with a transformation involving an XOR operation. Additional, fewer, or different operations may be performed depending on the particular embodiment. In an operation 33, a cover binary image X is split into even and odd two parts, denoted by X1 and X2, respectively. For each row in X2, a logical operation such as an XOR operation is applied to the row and its immediately above row in an operation 35. In an operation 37, all of the rows are listed together while keeping their order from top to bottom, thus forming a two dimensional array Y. In an operation 39, the image Y is scanned row by row from top to bottom, from left to right, ignoring the beginning consecutive white pixels and the consecutive black pixels at the end. An RL histogram-pair lossless data embedding method is applied in an operation 41, resulting in another two dimensional array, Z. In an operation 43, each even row in X2 is replaced from top to bottom with corresponding rows of Z. In an operation 45, X1 and Z are combined, treating X1 as the odd part and Z as corresponding even part, resulting in a marked image, which is the original image with hidden data.

In Table 17, an example two-row, odd line x1 and even line x2, and 15-column binary image is shown. Odd line x1 is fixed during data embedding and extraction, while even line x2 is manipulated during data hiding and extraction.

TABLE 17

| Number of Column | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Odd line x1 of cover image | 1 | 0 | 0 | 0 | 0 | 0 | 0 | 0 | 0 | 0 | 0 | 0 | 1 | 1 | 1 |
| Even line x2 of cover image | 1 | 0 | 1 | 0 | 0 | 1 | 0 | 0 | 1 | 0 | 0 | 1 | 0 | 0 | 1 |
| x3 = x1 ⊕ x2 | 0 | 0 | 1 | 0 | 0 | 1 | 0 | 0 | 1 | 0 | 0 | 1 | 1 | 1 | 0 |
| Even line x4: after data embedding into x3 | 0 | 0 | 1 | 1* | 0 | 1 | 0 | 0 | 1 | 1* | 0 | 1 | 1 | 1 | 0 |
| Odd line x1' (after data embedding): x1' = x1 | 1 | 0 | 0 | 0 | 0 | 0 | 0 | 0 | 0 | 0 | 0 | 0 | 1 | 1 | 1 |
| Even line x2' (after data hiding): x2', = (x1 ⊕ x4) | 1 | 0 | 1 | 1* | 0 | 1 | 0 | 0 | 1 | 1* | 0 | 1 | 0 | 0 | 1 |

TABLE 18

| | | | |
|---|---|---|---|
| Black RL: <1, 1, 1, 3><br>White RLC<2, 2, 2, 1><br>RL couple sequence: <1, 2>, <1, 2>, <1, 2>, <3, 1> | | | |
| Black RL | 1 | 2 | 3 |
| Histogram of black RL (occurrence) | 3 | 0 | 1 |

Comment: Black RL histogram pair [3, 0] can be used for data embedding.

TABLE 19

| | | | |
|---|---|---|---|
| Black RL: <2, 1, 2, 3><br>White RLC<1, 2, 1, 1><br>RL couple sequence: <2, 1>, <1, 2>, <2, 1>, <3, 1> | | | |
| Black RL | 1 | 2 | 3 |
| Histogram of black RL (occurrence) | 1 | 2 | 1 |

Comment: After data embedding, black histogram pair [3, 0] has changed to [1, 2] (T = 1, and T1 = 3)

Figure 4:
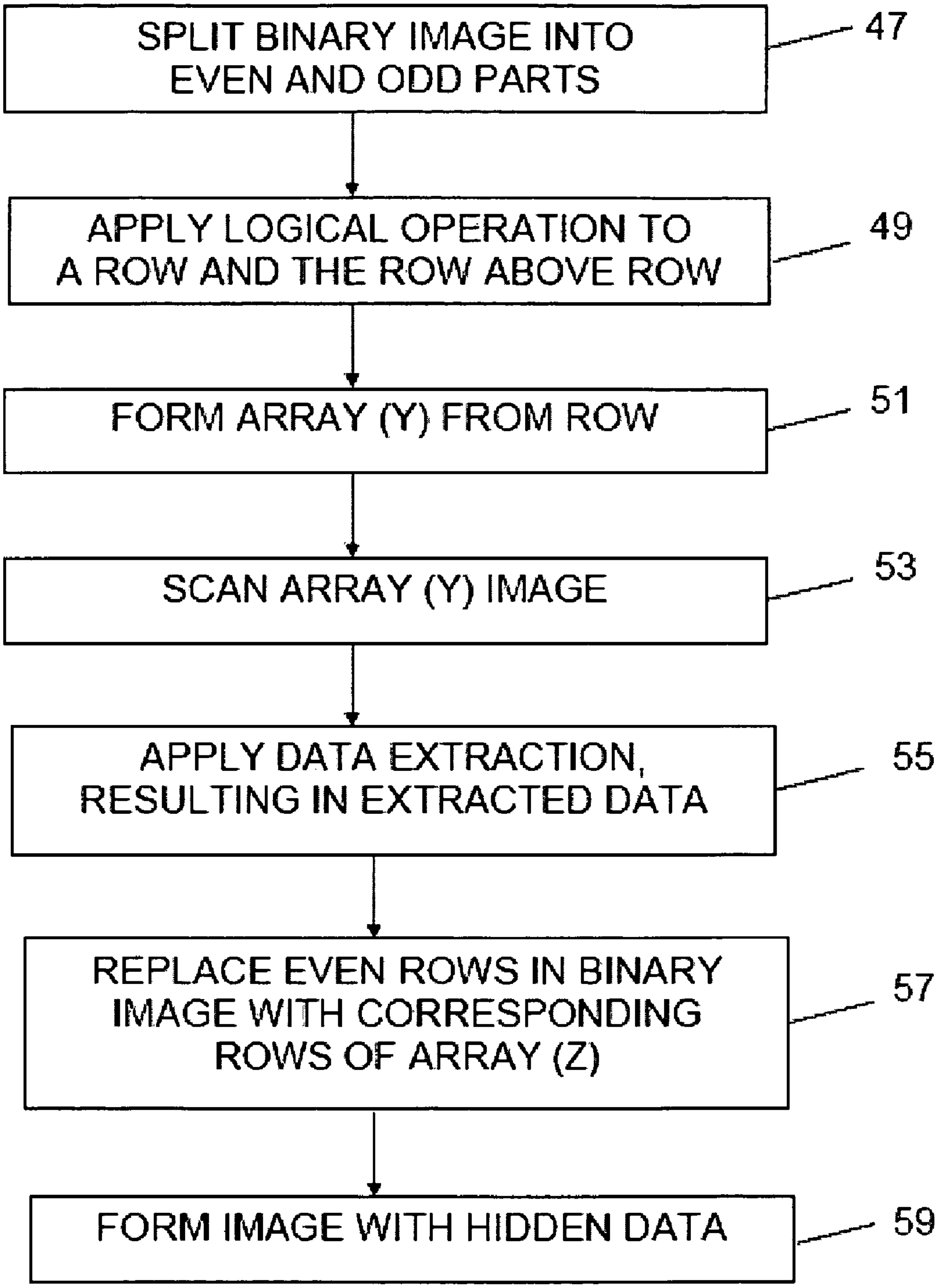
FIG. 4 is a flow diagram of a data extraction process in accordance with a representative embodiment.

FIG. 4 illustrates operations performed in an example data extraction procedure. Additional, fewer, or different operations may be performed depending on the particular embodiment. In an operation 47, a given binary image X is split into even and odd two parts, denoted by X1 and X2, respectively. For each row, a logical operation such as an XOR operation is applied to this row and its immediately above row (belonging to X1) in an operation 49. In an operation 51, all of the rows are listed together while keeping their order from top to bottom, thus forming a two dimensional array Y. In an operation 53, the image Y is scanned row by row from top to bottom, from left to right, ignoring the beginning consecutive white pixels and the consecutive black pixels at the end. A data extraction procedure is applied in an operation 55, resulting in extracted data and another two dimensional array, Z. In an operation 57, each even row in X2 is replaced from top to bottom with corresponding rows of Z. In an operation 59, X1 and Z are combined, treating X1 as the odd part and Z as corresponding even part, resulting in the original image with hidden data.

The marked image obtained is shown in Table 20. Applying the procedure described results in the extracted data "1,0,1" and the original binary image. Intermediate results and RL and RL histograms are shown in Table 20, 21 and 22, respectively.

TABLE 20

| Number of Column | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Odd line x1' = x1 | 1 | 0 | 0 | 0 | 0 | 0 | 0 | 0 | 0 | 0 | 0 | 0 | 1 | 1 | 1 |
| Even line x2' | 1 | 0 | 1 | 1* | 0 | 1 | 0 | 0 | 1 | 1* | 0 | 1 | 0 | 0 | 1 |
| x3' = x1' ⊕ x2' | 0 | 0 | 1 | 1* | 0 | 1 | 0 | 0 | 1 | 1* | 0 | 1 | 1 | 1 | 0 |
| x4': after data extraction from x3' | 0 | 0 | 1 | 0 | 0 | 1 | 0 | 0 | 1 | 0 | 0 | 1 | 1 | 1 | 0 |
| Recovered even line: x2 = (x4' ⊕ x1) | 1 | 0 | 1 | 0 | 0 | 1 | 0 | 0 | 1 | 0 | 0 | 1 | 0 | 0 | 1 |

Comment: Both odd line 1 and even line 2 in the recovered image remain the same as in the original image.

TABLE 21

Black RL: <2, 12, 3>
White RL: <1, 2, 1, 1>
RL couple sequence: <2, 1>, <1, 2>, <2, 1>, <3, 1>
Note that the "0, 0" at the beginning of x3' are not counted.

| Black Run Length | 1 | 2 | 3 |
|---|---|---|---|
| Histogram of Black Run Length (occurrence) | 1 | 2 | 1 |

Comment: Data is to be extracted from [h(1) = 1, h(2) = 2]

TABLE 22

Black RL: <1, 1, 1, 3>
White RL: <2, 2, 2, 1>
RL couple sequence: <2, 1>, <1, 2>, <2, 1>, <3, 1>

| Black Run Length | 1 | 2 | 3 |
|---|---|---|---|
| Histogram of Black Run Length (occurrence) | 3 | 0 | 1 |

Comment: After data extraction, the [h(1) = 1, h(2) = 2] changes to the histogram pair [h(1) = 3, h(2) = 0].

For a grayscale image, after data embedding using a histogram pair based scheme, it is possible to cause underflow and/or overflow problems, which mean that the grayscale values in spatial domain may exceed the allowable range. For example, for an 8-bit grayscale image after data embedding into integer wavelet coefficients, it is possible that the grayscale values exceed the range from 0 to 255, denoted as [0,255]. When the resultant grayscale value is below 0, it is referred to as underflow, while it is above 255 it is referred to as overflow. There is a similar problem existing in lossless data hiding into binary image, referred to herein as a boundary problem.

Representative embodiments described herein apply histogram pair based lossless data hiding scheme to histogram of run-length (RL) to embed data. As shown above, for a selected histogram pair, embedding a bit 1 leads to increasing the black run-length by 1, and the same decreasing the immediately next white-length by 1. By adjusting a couple of black and white run-length in this fashion, the appearance of the binary image after data embedding remains similar to the original one, i.e., the change is not be easily perceived by human visual systems. In addition, the hidden data can later be extracted from the marked image losslessly. However, a boundary problem can occur when the white run-length is only 1 (referred to as isolated white point), and its immediately proceeding black run-length happens to be added by 1 in order to embedding a bit 1. That is, according to the data embedding rule, the black run-length needs to increase by 1 and the following white space needs to decrease by 1, resulting the white run-length becoming 0. Once this phenomenon occurs, the data cannot be recovered reversibly, indicating a problem that damages reversibility.

There is no boundary problem if a given binary image has no white run-length being 1. That is, the binary image does not have isolated white point. The representative lossless data hiding approaches to binary image can work straightforwardly without any problem. The following are embodiments which include solutions to the boundary problem.

When the boundary problem does happen, there are a few ways to apply the representative embodiments to lossless data hiding into binary image. That is, there are a few different ways via which the boundary problem described above can be avoided. One way to solve this boundary problem is to double resolution of the given binary image prior to data hiding. The isolated white points disappear after resolution is doubled. In this high resolution binary image, a lossless data hiding scheme is applied. After data extraction, the resolution can be changed back to the original one. In this way, the boundary problem can be avoided. It is noted that, however, the marked image is in doubled resolution.

Another way to solve the boundary problem is to check, prior to lossless data hiding, the areas of the given binary image in which there is no the boundary problem. Then, a representative embodiment is applied only to these areas of the given binary image. In doing so, the decoding side should be informed of this information.

If it is found that there is no boundary problem if data is embedded for a certain range of black run-length values, then data is embedded only to the black run-lengths within this range. Similar to case 2 discussed above, in either case, the data extracting side should be informed of this information.

One way to handle the boundary problem is to rely on a pre-processing as described as follows. That is, pre-processing can eliminate the situation with white run-length being 1, i.e., the isolated white pixels in a row of binary image. One such types of pre-processes can be a low-pass filtering to eliminate isolated white pixels, meaning that isolated white pixels are substituted by black pixels to form a longer black run-length. Under this circumstance, embedded data can be recovered losslessly. However, as to the image recovering, only the pre-processed binary image can be lossless recovered instead of the original binary image. Although this proposed solution to the boundary problem cannot losslessly recover the original image exactly, it can be applied for some applications as a new technology of digital embedding/watermarking.

At least one representative embodiment handles smoothly isolated white points. All of the white run-length (RL) values are examined before data embedding. For those cases where the white run-length is 1, the run-length couple, i.e., its immediately black run-length and this white run-length (associated with this isolated white point), is considered. The white RL is increased by one while reduce the black RL (in this RL couple) by one. In this way, the sum of black RL and white RL remains unchanged while the isolated white point has been eliminated. As discussed above, this type of information needs to be recorded in order to be used in data extraction and original image recovery.

It should be noted that the sum of black RL and white RL is two, meaning that both black RL and white RL are equal to one, the above proposed method may not work. To resolve this possible issue, another threshold T1 is set up, which is defined as the sum of black RL and white RL in a RL couple. T1 is at least 3. In other words, data is embedded only for those RL couples whose sum of black RL and white RL in the RL couple is equal to or larger than T1. Moreover, it is noted that the selection of T1 may make the proposed lossless data hiding scheme work more efficiently.

In Table 23, a binary image of two-row and 15-column is displayed. It is observed that there is an isolated white point located on the second row and $14^{th}$ column, marked with underlining. The RL and RL histogram of this binary image is shown in Table 24. In calculating RL, the whole image is scanned in a certain order, for example, from left to right, or from top to bottom. Consecutive white points at the beginning of the first row and the consecutive black point at the end of the second row are ignored. It is noted that the RL couple including the isolated white point is <2,1>, i.e., the last RL couple shown in Table 24. In this couple, the black RL is two and the white RL is one. In other words, the sum of the black RL and the white RL is 3. Therefore, as mentioned above, it is possible to eliminate this isolated white point by changing the left-most black point of the isolated white point, i.e., the black point located at second row and $13^{th}$ column, to a white point. After this change, the resultant binary image is shown in Table 25, and the corresponding RL and RL histogram is shown in Table 26. Now the modified binary image is ready for data hiding. To achieve reversibility in data hiding, however, this change, i.e., the black point at $2^{nd}$ row and $13^{th}$ column has been changed to a white point should be recorded for later use in original binary image recovery after hidden data extraction.

TABLE 23

| Number of column | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Odd line x1 | 1 | 0 | 0 | 0 | 0 | 0 | 0 | 0 | 0 | 0 | 0 | 0 | 1 | 1 | 1 |
| Even line x2 | 0 | 0 | 1 | 0 | 0 | 1 | 0 | 0 | 1 | 0 | 0 | 1 | 1 | 0 | 1 |

Comment: The isolated white point is located at line x2 and column 14

TABLE 24

Black RL: <1, 3, 1, 1, 1, 2>
White RL: <11, 2, 2, 2, 2, 1>
RL couple sequence: <1, 11>, <3, 2>, <1, 2>, <1, 2>, <1, 2>, <2, 1>.

| | | | |
|---|---|---|---|
| Black RL | 1 | 2 | 3 |
| Histogram of black RL (occurrence) | 5 | 0 | 1 |
| White RL | 1 | 2 | 11 |
| Histogram of black RL (occurrence) | 1 | 4 | 1 |

Note that the last (right end) black point is not counted in the second row in RL histogram.

TABLE 25

| Number of Column | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Odd Line x1 | 1 | 0 | 0 | 0 | 0 | 0 | 0 | 0 | 0 | 0 | 0 | 0 | 1 | 1 | 1 |
| Even Line x2 | 0 | 0 | 1 | 0 | 0 | 1 | 0 | 0 | 1 | 0 | 0 | 1 | 0 | 0 | 1 |

TABLE 26

Black RL: <1, 3, 1, 1, 1, 1>
White RL: <11, 2, 2, 2, 2, 2>
RL couple sequence: <1, 11>, <3, 2>, <1, 2>, <1, 2>, <1, 2>, <1, 2>.

| | | | |
|---|---|---|---|
| Black RL | 1 | 2 | 3 |
| Histogram of black RL (occurrence) | 5 | 0 | 1 |
| White RL | 1 | 2 | 11 |
| Histogram of black RL (occurrence) | 0 | 5 | 1 |

Note that the sum of black RL and white RL within one RL couple remains unchanged in isolated white point elimination.

Figure 5:
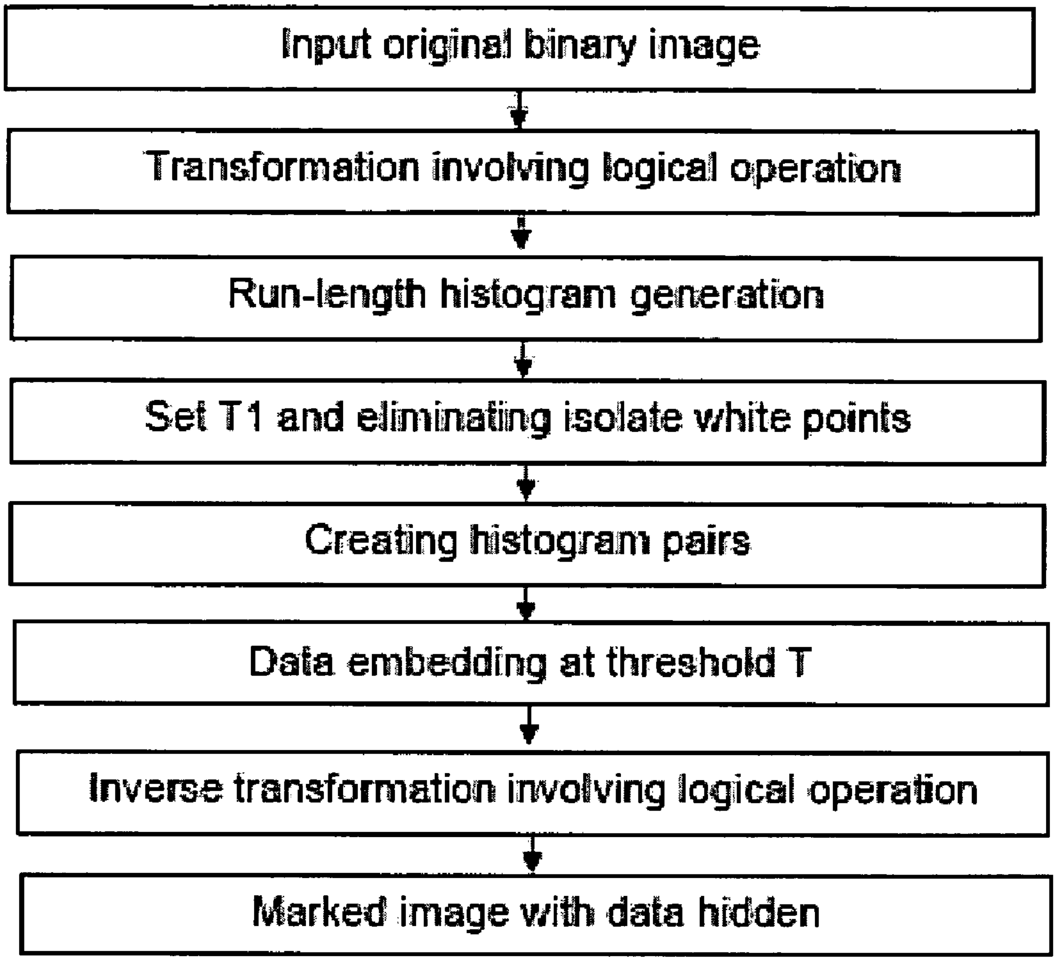
FIG. 5 is a flow diagram of data embedding in accordance with a representative embodiment.
Figure 6:
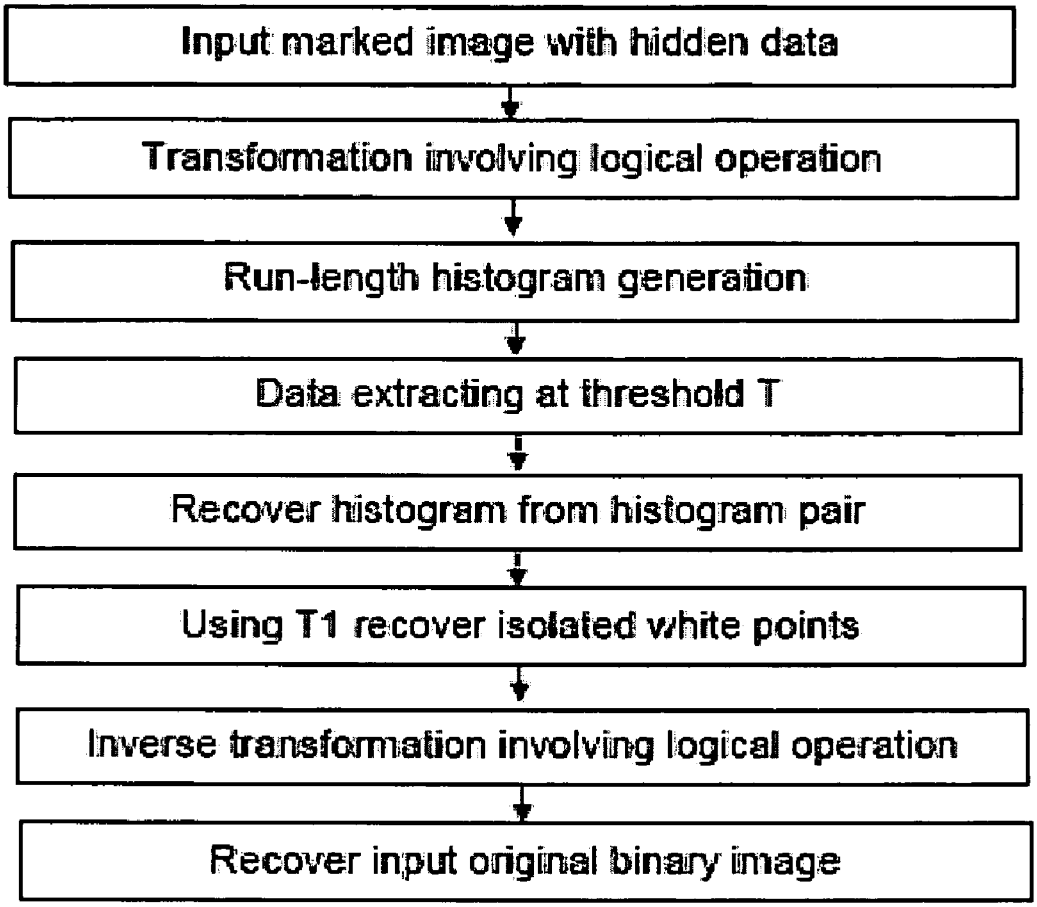
FIG. 6 is a flow diagram of data extraction in accordance with a representative embodiment.

A block diagram of a representative data embedding process is shown in FIG. 5. The transformation involving a logical operation is optional. Although it often brings out better performance in reversible data hiding, one can still reversibly embed data into binary images without using the transformation. A block diagram for a representative data extraction is shown in FIG. 6. Since the "Transformation involving logical operation" is optional in data embedding, it is also optional in data extraction.

Figure 7A:
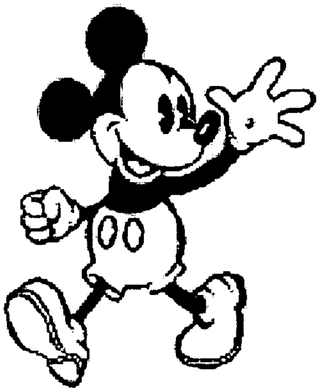
FIG. 7(*a*) is an original image of Mickey Mouse walking.
Figure 7B:
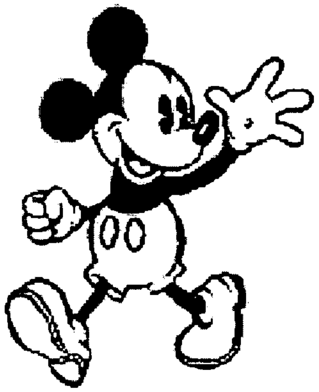
Figure 7C:
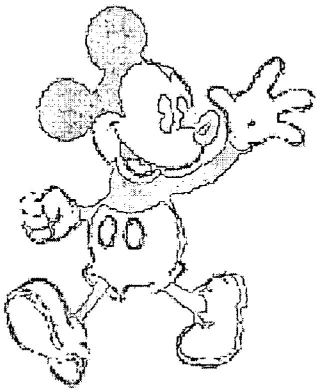
Figure 8A:
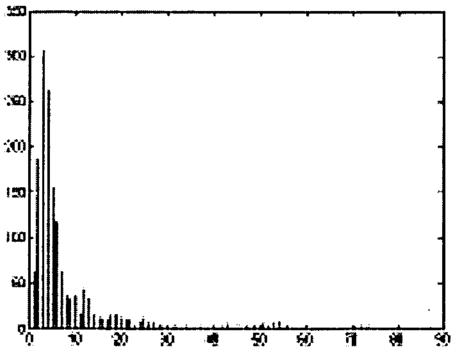
FIG. 8(*a*) is the histogram of the image of FIG. 7(*a*).
Figure 8B:
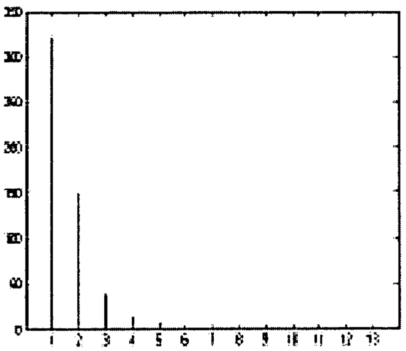

An example implementation of the representative embodiments is demonstrated with the following experimental results from a "Walking Mickey" image and a Chinese characters image. A binary image of a "Walking Mickey" is 274×312 in size. The image is applied to the lossless data hiding algorithm with transformation involving AND operation. The total number of 128 bits is embedded at one-time embedding and the bookkeeping data is not included in these 128 bits. There are 137 pixels in the marked image which are different from the original image. The Walking Mickey images and histograms of black run-length before and after AND operation are shown in FIG. 7 and FIG. 8, respectively. From the histograms shown in FIGS. 8(*a*) and (*b*), it is observed that the black run-length (RL) histogram after the AND operation has been more concentrated on the end of short RL, indicating the positive role played by AND operation. In S. V. D. Pamboukian and H. Y. Kim, "Reversible Data Hiding and Reversible Authentication Watermarking for Binary Images," in VI *Simpósio Brasileiro em Segurança da Informação e de Sistemas Computacionais* (*SBSeg*), Santos, SP, Brasil, 2006, Pamboukian et al. applied their reversible binary image data hiding technique to embed 128 bits into the same Walking Mickey image, resulting in 496 pixels which have been changed after the data embedding. Compared to the Pamboukian et al. method, the technique of the representative embodiments only cause 137 different pixels, while embedding the same amount of 128 bits.

Figure 9A:
FIG. 9(*a*) is an original image of a baboon.
Figure 9B:
Figure 9C:

A non-halftone binary baboon image is obtained by applying im2bw operation in Matlab to grayscale Baboon image. It is 512×512 in size. The 1063 bits has been embedded at one time embedding. The amount of bookkeeping data 230 bits and not counted in the payload of 1063 bits. There are 1694 pixels in the marked image which are different from the original binary image. The Baboon original, marked and difference images are shown in FIGS. 9(*a*), 9(*b*) and 9(*c*).

Table 27 contains a series of experiments of embedding data into Baboon non-halftone binary image of 512×512 with transformation with AND operation. The PSNR for the binary image is calculated using the following formula where N is the total number of pixels in the binary image and F and f are the pixel values (0 or 1 for binary images).

$$PSNR = 10\times\log_{10}\left[N\Big/\left(\sum_i (F_i - f_i)^2\right)\right],\quad \text{where } i = 1, \ldots , N$$

TABLE 27

| Capability (bit) (Bookkeeping not included) | PSNR | Number of changed pixels | Bookkeeping (bits) |
|---|---|---|---|
| 100 | 35.4931 | 74 | 0 |
| 200 | 32.8500 | 136 | 0 |
| 300 | 30.5305 | 232 | 0 |
| 409 | 28.7571 | 349 | 0 |
| 516 | 27.1097 | 510 | 1 |
| 641 | 25.6484 | 714 | 8 |
| 783 | 24.4127 | 949 | 45 |
| 867 | 23.7088 | 1116 | 84 |
| 1063 | 22.0264 | 1644 | 230 |

Furthermore, the representative embodiments can be used to embed data into a binary image multiple times. One way to do so is to embed data into an odd part (with even part fixed) and then embed data into an even part (with odd part fixed) alternatively to implement multiple-time dada embedding. Another way is to repeatedly rotate the binary image by 90 degree for multiple-time data embedding. Table 28 contains information about multiple-time data embedding for non-halftone Baboon image with transformation using AND operation.

TABLE 28

| Times of loops | Capability (bit) (Bookkeeping not included) | PSNR | Number of Pixel Changed | Bookkeeping (bit) |
|---|---|---|---|---|
| 1 | 1063 | 22.0264 | 1644 | 230 |
| 2 | 1641 | 19.6263 | 2857 | 354 |
| 3 | 3176 | 17.4121 | 4757 | 898 |
| 4 | 4287 | 16.6206 | 5708 | 1344 |
| 5 | 4955 | 15.5557 | 7294 | 1680 |
| 6 | 5490 | 15.0362 | 8221 | 1799 |
| 7 | 6727 | 14.2630 | 9823 | 2389 |
| 8 | 7490 | 13.8669 | 10761 | 2517 |

Figure 10A:
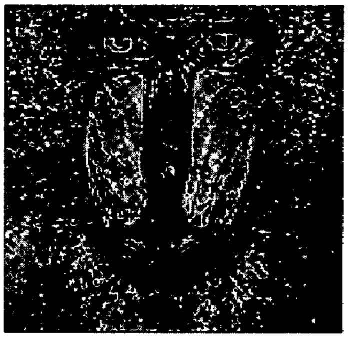
FIG. 10(*a*) is an original half-tone image of a baboon.
Figure 10B:
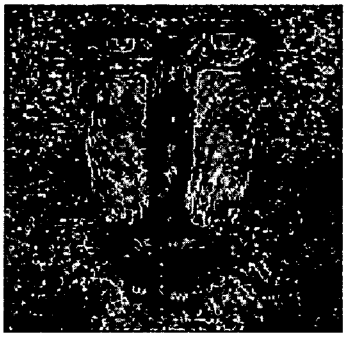
Figure 10C:
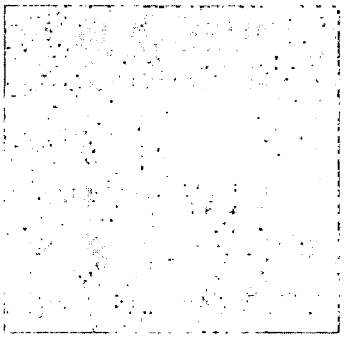
Figure 11A:
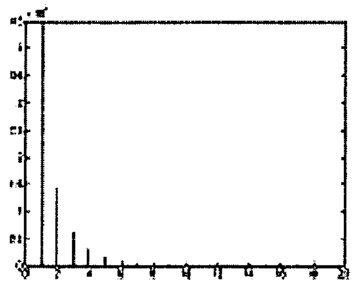
FIG. 11(*a*) is a run-length histogram before transformation with an XOR operation.
Figure 11B:
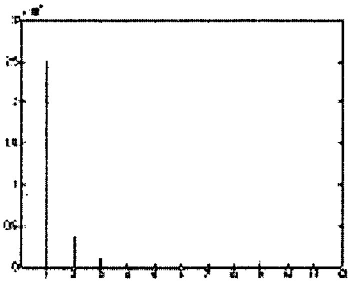

A halftone baboon image is obtained by applying a dither operation in Matlab to grayscale Baboon image. It is 512×512 in size. The total number of 7699 bits has been embedded at one time, excluding the bookkeeping data of 1491 bits. There are 6787 pixels that have changed during the data hiding. XOR operation has been used in the transformation. The Baboon images and histograms of black run-length before and after XOR operation are shown in FIGS. 10(*a*), 10(*b*) and 10(*c*), and FIGS. 11(*a*) and 11(*b*), respectively. From FIG. 11(*b*), it is observed that the histogram of black run-length after transformation involving XOR operation has become more concentrated on the lower end, hence facilitating data embedding. One-time data embedding into halftone Baboon image with various capacities is shown in Table 29.

TABLE 29

| Capability (bit) (Bookkeeping not included) | PSNR | Number of Pixel Changed | Bookkeeping (bit) |
|---|---|---|---|
| 100 | 37.3730 | 48 | 0 |
| 200 | 33.4299 | 119 | 0 |
| 400 | 30.3652 | 241 | 0 |
| 800 | 26.8857 | 537 | 0 |
| 1600 | 23.6816 | 1123 | 7 |
| 2400 | 21.8656 | 1706 | 22 |
| 3200 | 20.4636 | 2356 | 50 |
| 4000 | 19.2564 | 3111 | 123 |
| 4800 | 18.2041 | 3964 | 376 |
| 5600 | 17.6697 | 4483 | 376 |
| 6400 | 16.4111 | 5990 | 1491 |
| 7699 | 15.8686 | 6787 | 1491 |

Figure 13A:
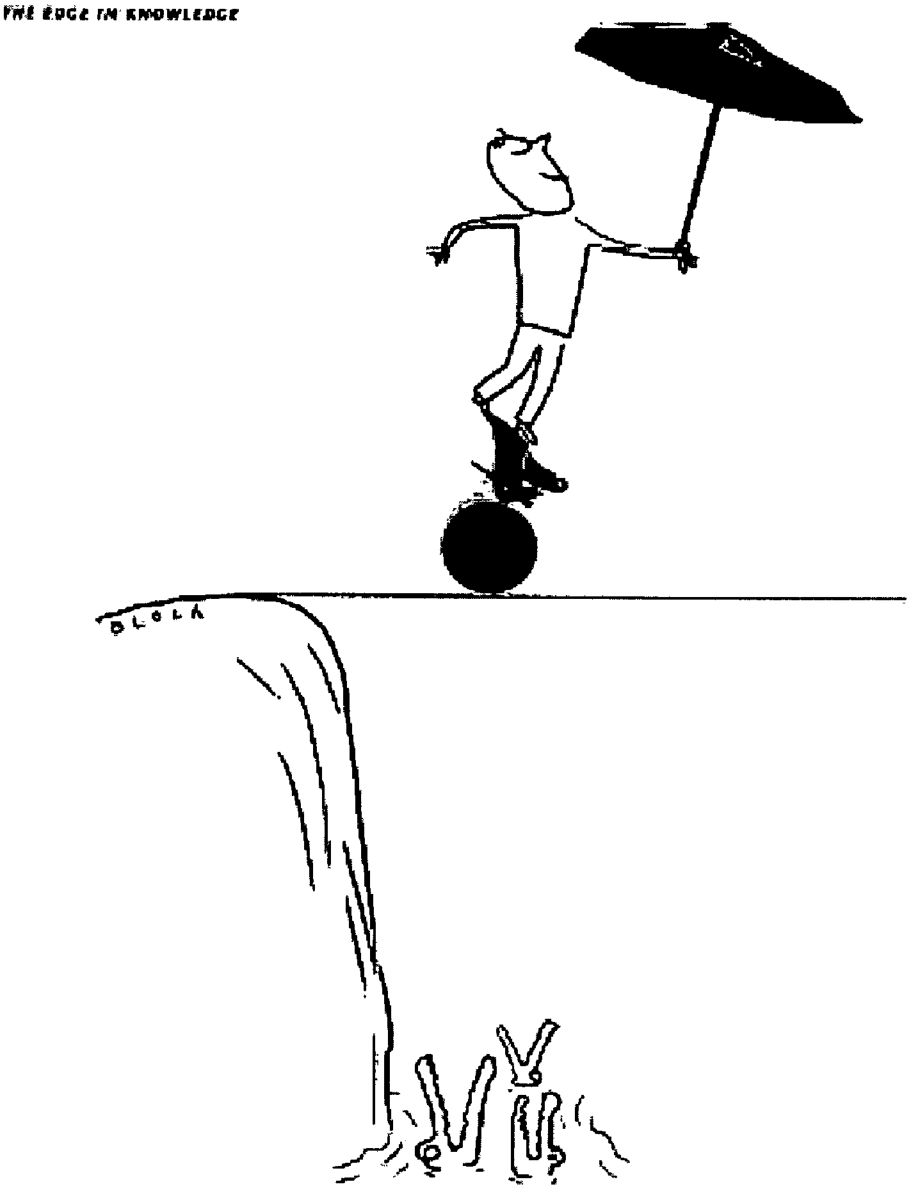
FIG. 13(*a*) is an original image of a cartoon.
Figure 13B:
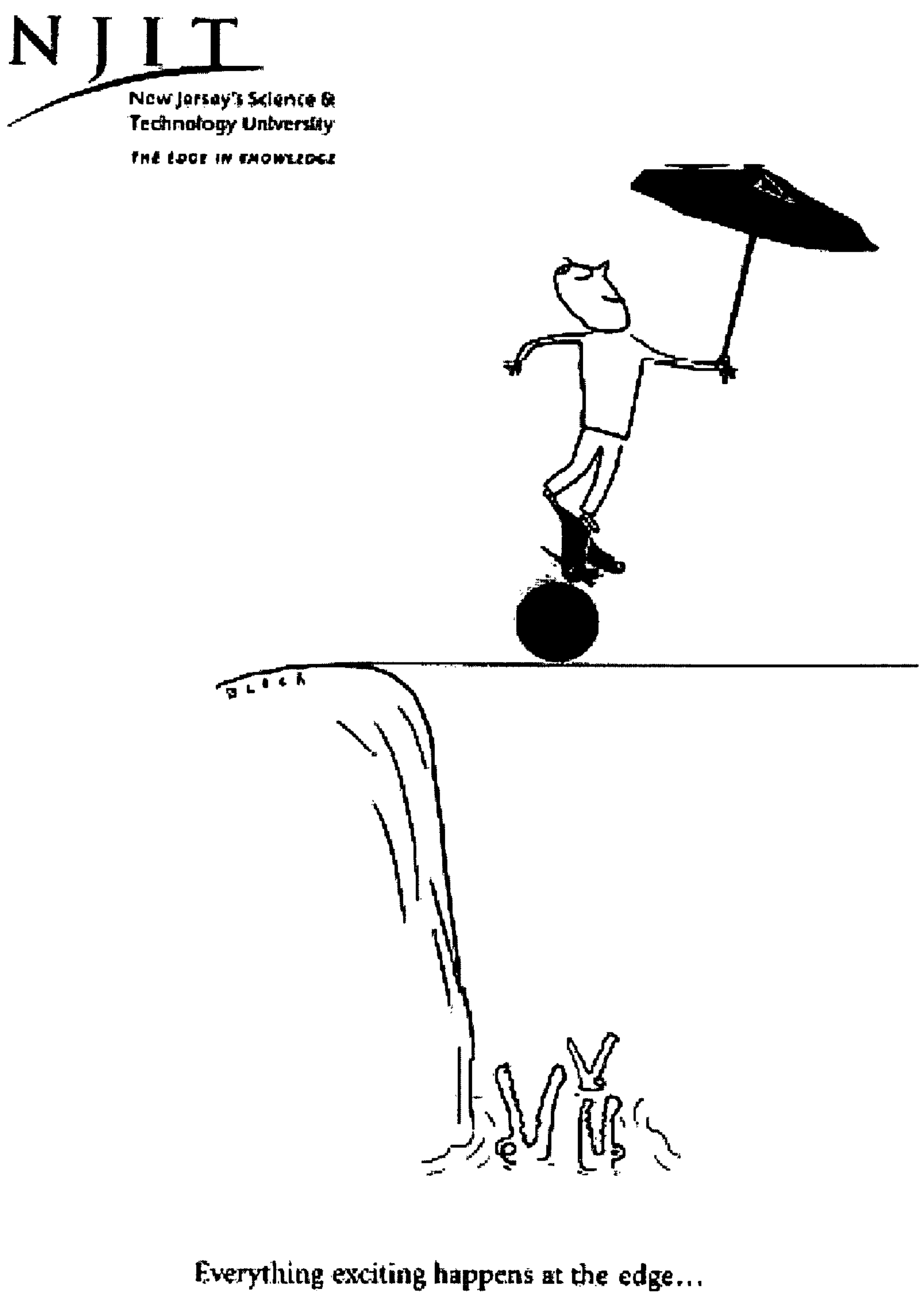
Figure 13C:
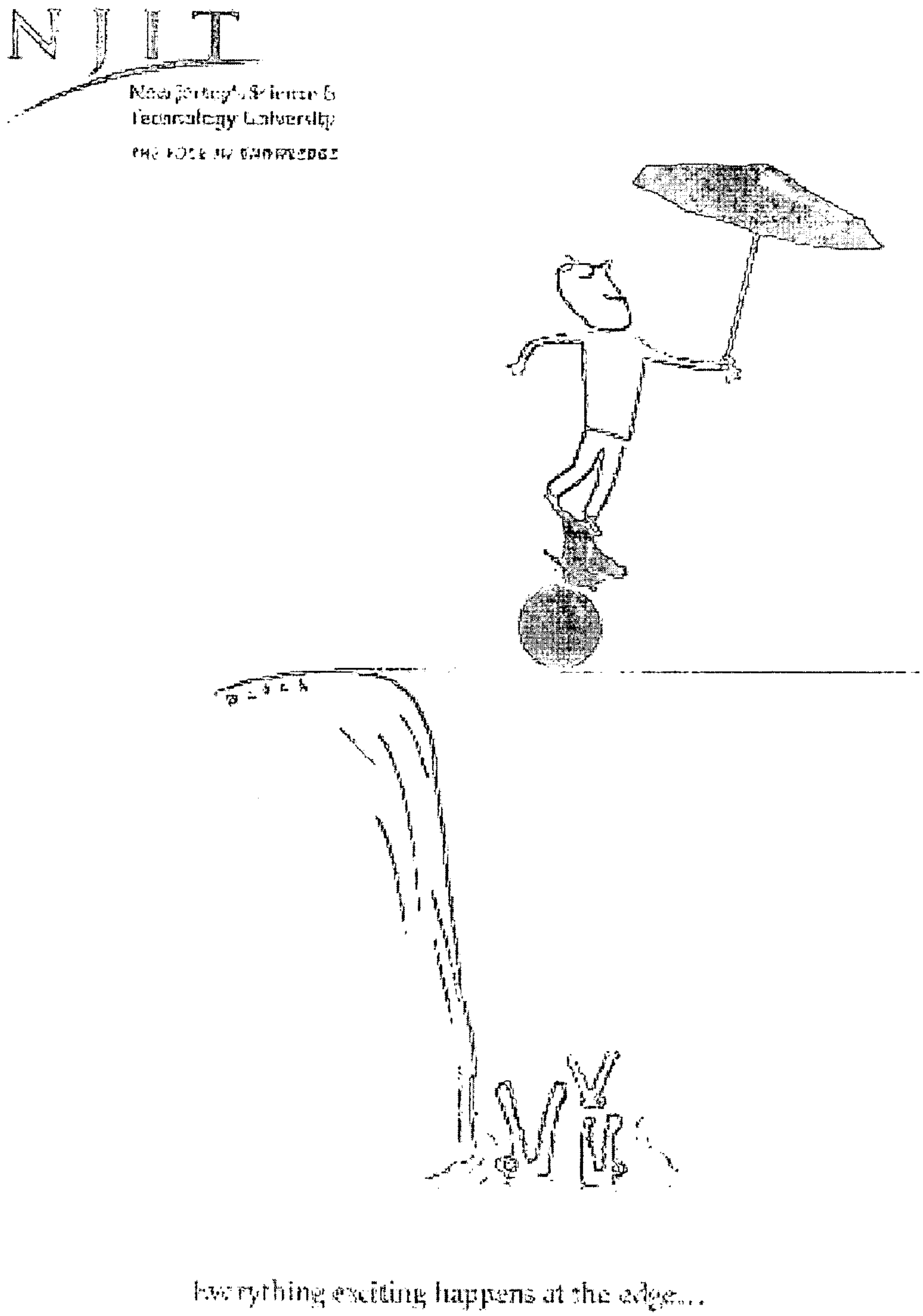
Figure 14C:
FIG. 14(*a*) is an original image of a newsletter.
Figure 15B:
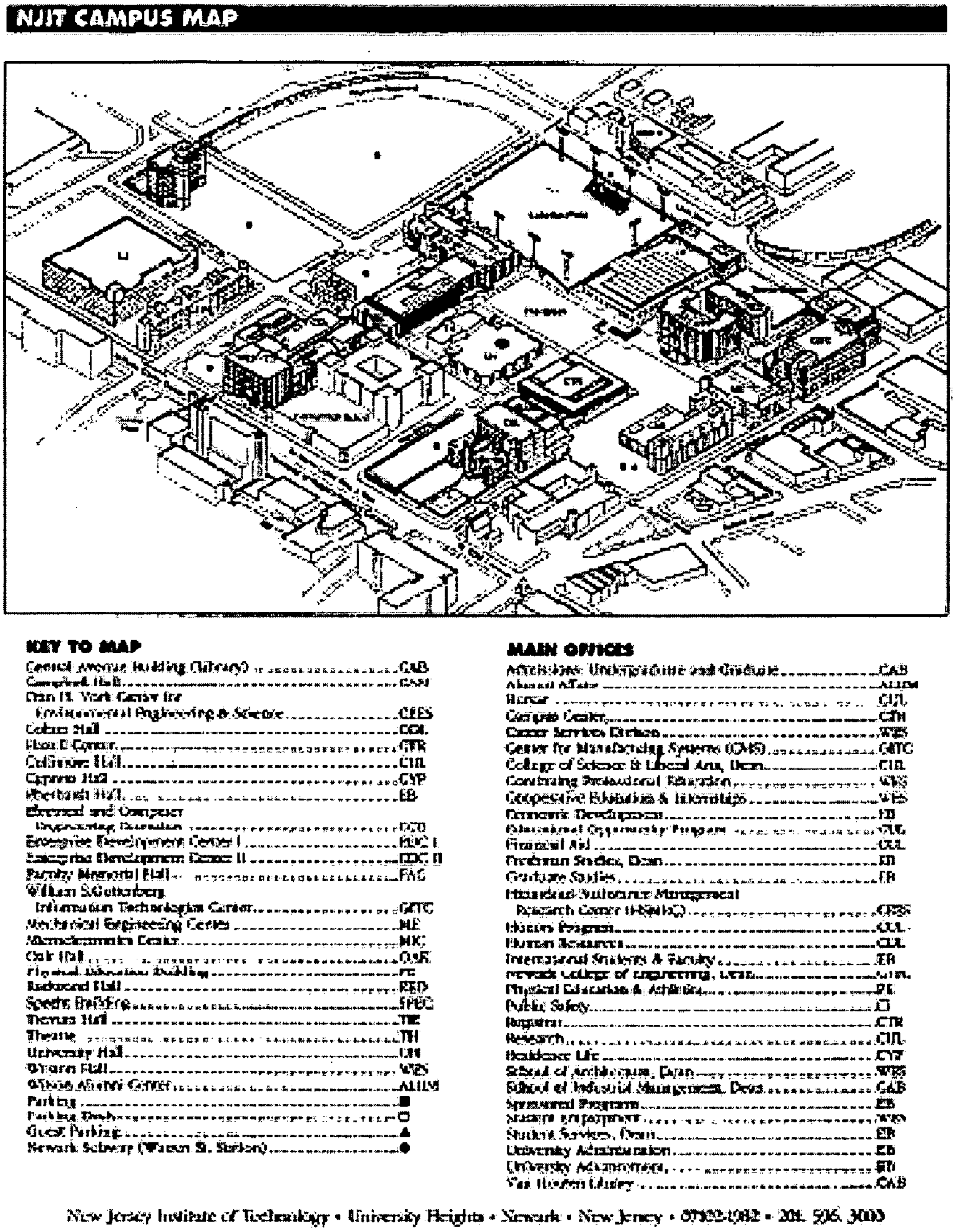
FIG. 15(*a*) is an original image of a map.
Figure 15C:
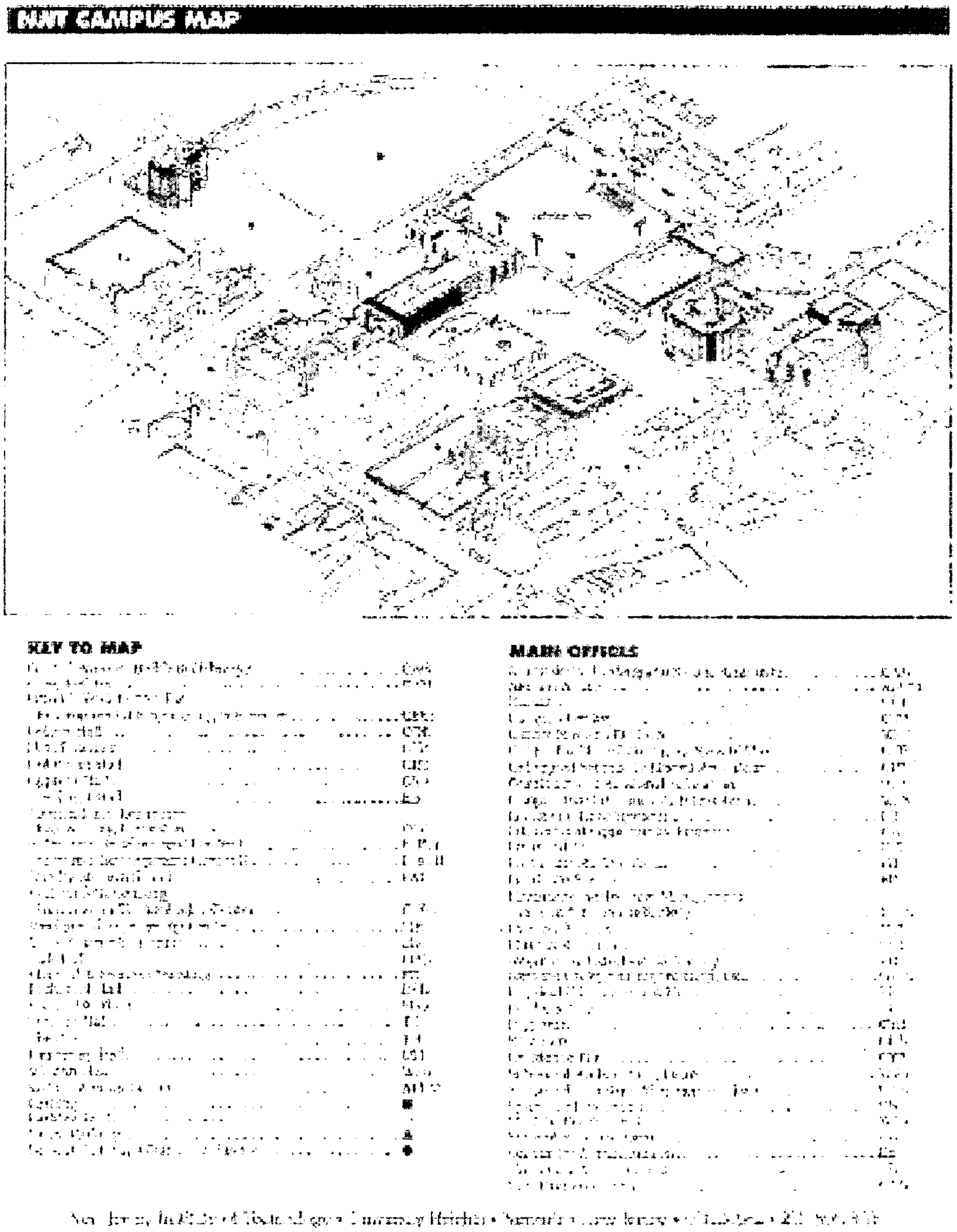

In FIGS. 12(*a*), 12(*b*) and 12(*c*), a group of three Chinese document images are shown. Their size is 1654×2338. 18,037 bits have been reversibly embedded. The PSNR is 26.2805 dB. Other example images, including original, marked and difference images, are included in FIGS. 13(*a*)-13(*c*) which show a cartoon, 14(*a*)-14(*c*) which show a newsletter, and 15(*a*)-15(*c*) which show a map.

Figure 16:
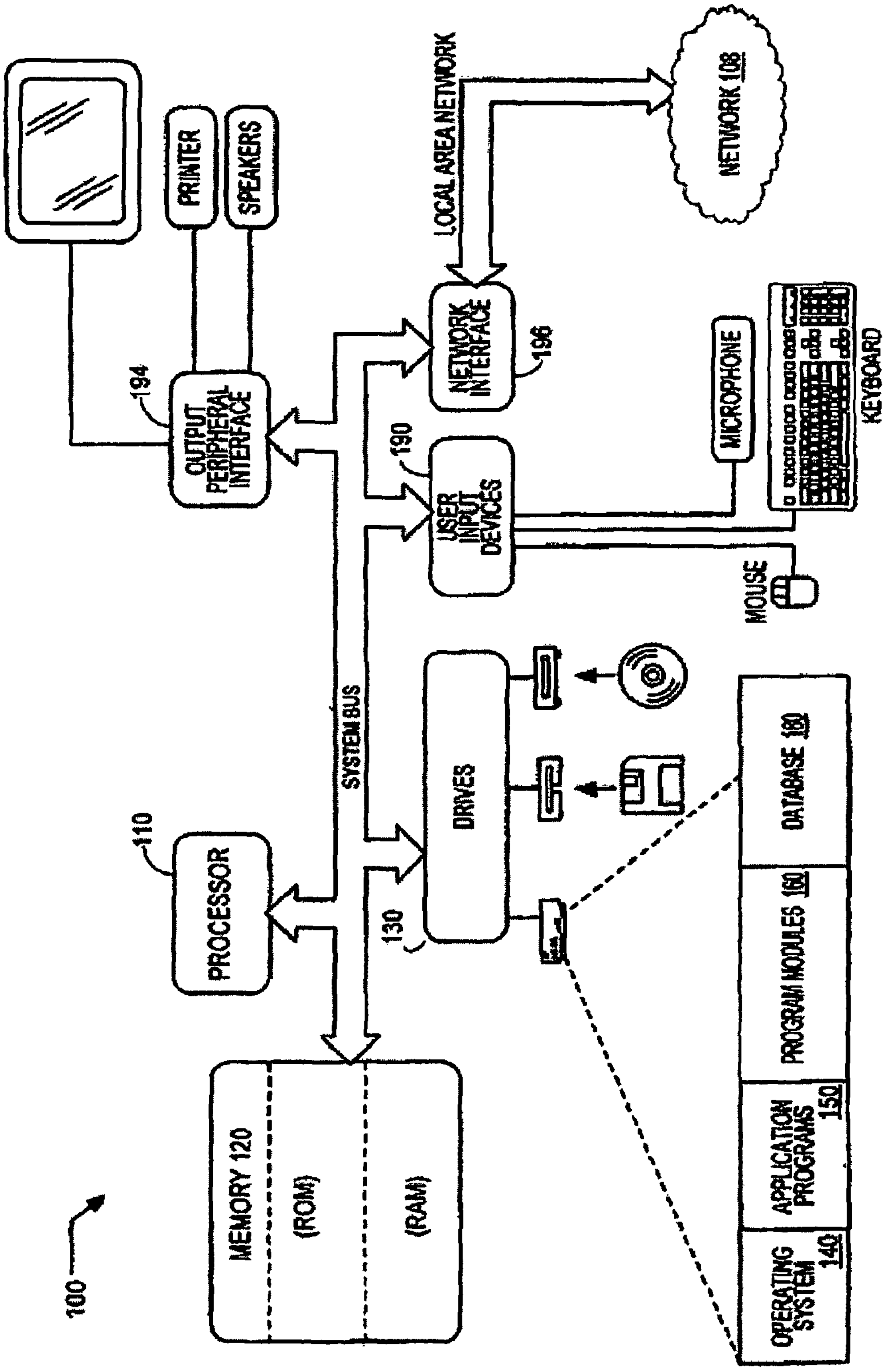
FIG. 16 depicts a reversible binary image data hiding computing system for implementing representative embodiments.

With reference to FIG. 16, a reversible binary image data hiding computing system for implementing representative embodiments is depicted. FIG. 16 includes a computer 100, including a processor 110, memory 120 and one or more drives 130. Drives 130 and their associated computer storage media, provide storage of computer readable instructions, data structures, program modules and other data for the computer 100. Drives 130 can include an operating system 140, application programs 150, program modules 160, and database 180. Computer 100 further includes user input devices 190 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be connected to processor 110 through a user input interface that is coupled to a system bus, but may be connected by other interface and bus structures, such as a parallel port, game port or a universal serial bus (USB). Computers such as computer 100 may also include other peripheral output devices such as speakers, which may be connected through an output peripheral interface 194 or the like.

As indicated, computer 100 implements representative embedding and extracting embodiments described with respect to FIGS. 1-15. As an example, memory 120 can contain programmed instructions to carry out operations described with reference to the flow diagrams of FIGS. 2-6. Processor 110 executes instructions contained in memory 120. According to the representative embodiments, original images are transformed to embedded certain data and images containing embedded data are transformed to extract embedded data. Accordingly, the method operations are performed on a particular machine, such as computer 100, and, furthermore, the method operations transform data, at least either by embedding or extracting data to or from an image.

Computer 100 may operate in a networked environment using logical connections to one or more computers, such as a remote computer connected to network interface 196 The remote computer may be a personal computer, a server, a router, a network PC, a peer device or other common network node, and can include many or all of the elements described above relative to computer 100. Networking environments are commonplace in offices, enterprise-wide area networks (WAN), local area networks (LAN), intranets and the Internet. For example, in the subject matter of the present application, computer 100 may comprise the source machine from which data is being migrated, and the remote computer may comprise the destination machine or vice versa. Note however, that source and destination machines need not be connected by a network 108 or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN, such as the Internet or network 108 It will be appreciated that other means of establishing a communications link between the computers may be used.

The foregoing description has been presented for purposes of illustration and of description. It is not intended to be exhaustive or limiting with respect to the precise form disclosed, and modifications and variations are possible in light of the above teachings or may be acquired from practice of the disclosed embodiments.

What is claimed is:

1. A method of hiding data in a data set, the method comprising:

creating a histogram of an attribute of a first data set, the histogram comprising occurrences of the attribute;

selecting two adjacent occurrences in the histogram, wherein a count of one of the two adjacent occurrences is zero; and embedding a second data set in data of the first data set associated with the selected adjacent occurrences, wherein the creating and the embedding comprising:

replacing an even part of the first data set with an exclusive-or of the even part and an odd part of the first data set;

creating the histogram of the attribute of the even part of the first data set;

embedding the second data set in data of the even part of the first data set associated with the selected occurrences; and replacing the embedded even part of the first data set with an exclusive-or of the embedded even part of the first data set and the odd part of the first data set.

2. The method of claim 1 further comprising:

analyzing a value of the data of the embedded first data set associated with the selected occurrences; and extracting the second data set from the embedded first data set based on the selected occurrences.

3. The method of claim 1 further comprising altering the first data set in order to create the two adjacent occurrences, wherein the count of one of the two adjacent occurrences is zero.

4. The method of claim 1 wherein the first data set comprises an image.

5. The method of claim 4 further comprising forming a one-dimensional sequence by concatenating rows of the image.

6. The method of claim 1 wherein the attribute comprises a data value.

7. The method of claim 1 wherein the attribute comprises a run length of a data value.

8. The method of claim 7 wherein the data value comprises a binary value.

9. The method of claim 8 further comprising selecting a first window, wherein the second data set is only embedded in even data of the first data set associated with the first window.

10. The method of claim 9 wherein the first window is associated with at least one sequence of a first data value followed by consecutive second values in an odd part of the first data set.

11. The method of claim 9 further comprising selecting a second window, wherein the second data set is only embedded in the even data of the first data set associated with the second window.

12. The method of claim 11 wherein the second window is associated with at least one sequence associated with the first window that does not include first sequence elements of a first data value and does not include last sequence elements of a second data value.

13. The method of claim 1 further comprising filtering the first data set.

14. The method of claim 1 further comprising doubling the resolution of the first data set before creating the histogram.

15. The method of claim 1 wherein the second data set is only embedded in couples of the first data set where a first number of a first value of the couple plus a second number of a second value of the couple is greater than a threshold.

16. The method of claim 1 further comprising:

creating a second histogram of a second attribute of the embedded first data set, the second histogram comprising second occurrences of the second attribute;

selecting two adjacent second occurrences, wherein a second count of one of the two adjacent second occurrences is zero; and embedding a third data set in data of the embedded first data set associated with the selected second occurrences.

17. The method of claim 16 further comprising manipulating the embedded first data set before creating the second histogram.

18. The method of claim 17 wherein manipulating the embedded first data set comprises rotating the embedded first data set ninety degrees.

19. A non-transitory computer-readable medium having computer-readable instructions stored thereon that, upon execution by a processor, cause a computing device to:

create a histogram of an attribute of a first data set, the histogram comprising occurrences of the attribute;

select two adjacent occurrences, wherein a count of one of the two adjacent occurrences is zero; and embed a second data set in data of the first data set associated with the selected occurrences, wherein the create and the embed comprising:

replace an even part of the first data set with an exclusive-or of the even part and an odd part of the first data set;

create the histogram of the attribute of the even part of the first data set;

embed the second data set in data of the even part of the first data set associated with the selected occurrences; and replace the embedded even part of the first data set with an exclusive-or of the embedded even part of the first data set and the odd part of the first data set.

* * * * *